United States Patent [19]
Girot et al.

[11] Patent Number: 5,470,463
[45] Date of Patent: Nov. 28, 1995

[54] PASSIVATED POROUS SUPPORTS AND METHODS FOR THE PREPARATION AND USE OF SAME

[75] Inventors: Pierre Girot, Paris; Egisto Boschetti, Croissy Sur Sei, both of France

[73] Assignee: Sepracor Inc., Marlborough, Mass.

[21] Appl. No.: 90,968

[22] Filed: Jul. 13, 1993

Related U.S. Application Data

[63] Continuation-in-part of Ser. No. 901,326, Jun. 19, 1992, abandoned.

[51] Int. Cl.⁶ .............................................. B01D 15/08
[52] U.S. Cl. ........................ 210/198.2; 210/502.1; 210/635; 210/656; 502/402
[58] Field of Search .................................. 210/635, 656, 210/198.2, 502.1; 502/402; 435/174, 176

[56] References Cited

U.S. PATENT DOCUMENTS

| | | | |
|---|---|---|---|
| 4,045,353 | 8/1977 | Kosaka | 210/198.2 |
| 4,140,653 | 2/1979 | Imura | 210/198.2 |
| 4,189,370 | 2/1980 | Boschetti | 210/198.2 |
| 4,229,536 | 10/1980 | DeFillippi | 435/176 |
| 4,335,017 | 6/1982 | Miles | 210/635 |
| 4,352,884 | 10/1982 | Nakashima et al. | 435/180 |
| 4,385,991 | 5/1983 | Rosevear | 210/635 |
| 4,415,631 | 11/1983 | Schutijser | 428/405 |
| 4,443,339 | 4/1984 | Rosevear | 210/635 |
| 4,452,916 | 6/1984 | Boschetti | 521/38 |
| 4,460,625 | 7/1984 | Emmons et al. | 427/136 |
| 4,618,533 | 10/1986 | Steuck | 428/315.7 |
| 4,627,992 | 12/1986 | Badenhop | 210/500.38 |
| 4,673,734 | 6/1987 | Tayot et al. | 530/364 |
| 4,724,207 | 2/1988 | Hou | 435/180 |
| 4,729,834 | 3/1988 | Itoh | 210/670 |
| 4,761,232 | 8/1988 | Bright | 210/500.42 |
| 4,882,048 | 11/1989 | Blaschke et al. | 210/198.2 |
| 4,882,226 | 11/1989 | Schutyser | 210/198.2 |
| 4,917,793 | 4/1990 | Pitt et al. | 210/94 |
| 4,931,498 | 6/1990 | Pidgeon | 210/656 |
| 4,933,372 | 6/1990 | Feibush et al. | 521/91 |
| 4,957,620 | 9/1990 | Cussler | 210/635 |
| 5,015,373 | 5/1991 | Carr | 210/198.2 |
| 5,030,352 | 7/1991 | Varady | 210/502.1 |
| 5,045,190 | 9/1991 | Carbonell | 210/198.2 |
| 5,047,438 | 9/1991 | Feibush et al. | 521/61 |
| 5,053,135 | 10/1991 | Boschetti | 210/635 |
| 5,066,398 | 11/1991 | Soria | 210/500.27 |
| 5,091,433 | 2/1992 | Wulff | 210/635 |
| 5,104,729 | 4/1992 | Stedronsky | 428/304.4 |
| 5,114,577 | 5/1992 | Kusano | 210/635 |
| 5,135,650 | 8/1992 | Hjerten | 210/198.2 |
| 5,137,633 | 8/1992 | Wang | 210/490 |
| 5,160,627 | 11/1992 | Cussler | 210/635 |
| 5,182,016 | 1/1993 | Funkenbusch | 210/656 |

FOREIGN PATENT DOCUMENTS

| | | | |
|---|---|---|---|
| 2541593 | 8/1984 | France | 210/198.2 |
| 50-115298 | 9/1975 | Japan | 210/198.2 |
| 51-074694 | 6/1976 | Japan | 210/198.2 |
| 52-054496 | 5/1977 | Japan | 210/198.2 |
| 61-074644 | 4/1986 | Japan | 210/198.2 |
| 62-286533 | 12/1987 | Japan | 210/198.2 |
| 747513 | 7/1980 | U.S.S.R. | 210/198.2 |

OTHER PUBLICATIONS

Snyder, Introduction to Modern Liquid Chromatography, John Wiley & Sons, Inc, New York, 1979, pp. 193–195 & 488–489.

*Primary Examiner*—Ernest G. Therkorn
*Attorney, Agent, or Firm*—Pennie & Edmonds

[57] ABSTRACT

This invention relates generally to modified porous solid supports and processes for the preparation and use of same. In particular, passivated porous mineral oxide supports are disclosed which are characterized by a reversible high sorptive capacity substantially unaccompanied by non-specific adsorption of or interaction with biomolecules. Passivation is achieved by use of a passivation mixture comprising a main monomer, a passivating monomer and a crosslinking agent, which mixture upon polymerization results in the substantial elimination of the undesirable non-specific interaction with biomolecules.

38 Claims, 5 Drawing Sheets

PASSIVATED POROUS SUPPORTS AND METHODS FOR THE PREPARATION AND USE OF SAME

This application is a continuation-in-part of Ser. No. 07/901,326, filed Jun. 19, 1992, now abandoned.

TECHNICAL FIELD

This invention relates generally to modified porous solid supports and processes for the preparation and use of same. In particular, passivated porous supports are disclosed which are characterized by a reversible high sorptive capacity substantially unaccompanied by non-specific adsorption of or interaction with biomolecules such as proteins, polysaccharides or oligo- or polynucleotides. Moreover, the passivated porous supports of the present invention exhibit other characteristics highly desirable in chromatographic applications, such as high porosity, physical rigidity, high charge density, and chemical stability under a variety of extreme conditions. The passivated porous supports of the present invention may also be used advantageously in a high flow, high efficiency mass transfer chromatographic technique which may be carried out in a fluidized-bed, packed-bed, or other mode of operation.

BACKGROUND OF THE INVENTION

2.1. GENERAL CONSIDERATIONS

Polyfunctional macromolecules, such as proteins, can be purified by a variety of techniques. One of these techniques is known as ion-exchange chromatography. In ion-exchange chromatography, proteins are separated on the basis of their net charge. For instance, if a protein has a net positive charge at pH 7 it will bind to a negatively charged ion-exchange resin packed in a chromatography column. The protein can be released, for example, by decreasing the pH or adding cations that compete for binding to the column with the positively charged groups on the protein. Thus, proteins that have a low density of net positive charge, and thus a lower affinity for the negatively charged groups of the column, will tend to emerge first, followed by those having a higher charge density.

Generally, the ion-exchange resins which are used in these procedures are solids possessing ionizable chemical groups. Two types exist: cation-exchangers, which contain acidic functional groups such as sulfate, sulfonate, phosphate or carboxylate, and a second type, anion-exchangers, which contain functional groups such as tertiary and quaternary amines. These ionizable functional groups may be inherently present in the resin or they may be the result of the chemical modification of the organic or mineral solid support.

Organic ionic-exchangers which are made from polysaccharide derivatives, e.g., derivatives of agarose, dextran and cellulose, etc., have been used for both laboratory and industrial scale ion-exchange chromatography. However, these ion-exchangers have many disadvantages. First, polysaccharide-derived ion-exchangers are not very mechanically stable and are not resistant to strong acids. This instability limits the length of the column and, also, limits the flow rate through the column.

Second, such ion-exchangers have limited sorption capacity due to the limited number of ionic or ionizable groups that can be attached to the polysaccharide.

Third, these polysaccharidic derivatives are poor adsorbents for use in rapid fluidized-bed separations because of the low density of the material. In a fluidized bed it is desirable to pass the fluid without simultaneously washing out the particles. Therefore, it is generally desirable to have as great a density difference as possible between the solid support particles (e.g., silica) and the fluidizing medium.

The intrinsic high density of inorganic sorbents based on passivated mineral substrates facilitates packing and rapid decantation into chromatographic columns. Dense packing prevents formation of empty spaces and channeling when using packed beds. On the other hand, fluidization of dense particles in aqueous suspension is possible at high flow rates that, in turn, are very desirable when dealing with large scale applications. Operation of fluidized beds at high superficial flow velocities is generally not possible with low-density organic or polymeric sorbents, which can be elutriated from fluidized beds at relatively low liquid flow rates.

On the other hand, synthetic polymers are mechanically more stable than inorganic supports, and the former are more resistant to strong acidic conditions. However, they suffer disadvantages as well, such as limited capacity, limited solute diffusivity and thus, limited productivity. These synthetic polymers also suffer to some extent from the problem of non-specific adsorption of biomolecules, such as proteins. Untreated mineral supports such as silica are also inadequate in many chromatographic protein separation applications because of such non-specific adsorption.

Non-specific adsorption is caused by the interaction of a protein with the surface of the support—be it organic or inorganic in nature. For example, silica is an acidic compound, and the negatively charged silanol groups present at the solid/liquid interface tend to create a separate ion-exchange interaction between the surface of silica and the protein. Non-specific adsorption is also caused by hydrogen bonding that takes place between, e.g., amino groups present in the amino acid residues of proteins and these same silanols present at the silica surface. Such non-specific interactions create separation problems during chromatography—e.g., poor protein recovery and/or inadequate resolution. An important objective in the design of a chromatographic separation is generally to ensure a "single-mode" process of adsorption. However, the ion-exchange behavior associated with surface silanols can create a "mixed mode" adsorption system which makes the separation of biomolecules much more difficult. Although the sorption capacity generated by ionic silanol groups is low, the intensity of the interaction between the silanol groups and proteins can be high. These interactions therefore have the potential to cause denaturation of certain proteins.

Finally, both polysaccharides and most hydroxyl-containing synthetic sorbents are sensitive to the cleaning solutions used in industrial settings, which often include strong oxidizing agents such as hypochlorite or peracetic acid and which may be characterized by extremes of pH.

Thus, there is an important need for the development of improved passivation methods for the treatment of the surfaces of both polymeric and inorganic chromatographic supports in contact with protein-containing solutions, which method is capable of preventing or minimizing such non-specific interactions between proteins and the chromatographic support in order to improve the efficiency of chromatographic processes.

2.2. PREVIOUS EFFORTS AT COATING SOLID SUPPORTS

Several previous investigators have sought to passivate various microporous media including membranes and particulate chromatographic supports by applying thin surface coatings to inorganic or organic/polymeric substrates. For example, Steuck, in U.S. Pat. No. 4,618,533, discloses a porous polymeric membrane substrate fashioned from a thermoplastic organic polymer upon which a permanent coating is grafted and/or deposited on the entire membrane surface. The polymerization and crosslinking of the polymerizable monomer upon and within the porous membrane substrate is performed in such a way that a thin coating is deposited upon the entire surface of the porous membrane, including the inner pore walls. Significantly, the porous configurations of the coated, composite membrane structures claimed by Steuck are essentially identical to those of the corresponding uncoated porous membrane substrates, implying that the polymer of Steuck is applied as a thin surface layer or coating that does not interfere with the porosity or flow properties of his composite membranes. Moreover, Steuck does not disclose the concept of a "passivating layer" or the use of monomers capable of functioning as "passivating" monomers within the meaning of the present invention as discussed in more detail below.

Varady et al., in U.S. Pat. No. 5,030,352, disclose pellicular support materials useful as chromatography media which are obtained by applying various thin hydrophilic coatings to the surfaces of hydrophobic polymer substrates (e.g., polystyrene). Varady's surface coatings are applied by first exposing the surfaces of the hydrophobic substrate to a solution of a solute characterized by interspersed hydrophilic and hydrophobic domains; contact between surface and solute takes place under conditions that promote hydrophobic-hydrophobic interaction between solute and substrate, with the result that solute molecules are adsorbed onto the surface of the substrate as a thin coating that is ultimately crosslinked in place. Varady's coating materials may further comprise reactive groups capable of being derivatized to produce various materials useful in ion-exchange, affinity, and other types of chromatographic and adsorptive separations.

Significantly, however, the hydrophilic, functional coating of Varady's invention is limited to a thin adherent film on the surface of the hydrophobic support. The morphology of this coating layer is a direct and unavoidable consequence of the stated method of its deposition—i.e., by the crosslinking of adjacent solute molecules adsorbed onto the surface of the hydrophobic substrate.

While Varady's coating method is at least partially effective in reducing the non-specific binding of proteins to the substrate, the sorption capacity of the chromatographic materials so produced is necessarily limited and inferior to those of the media produced by the process of the present invention. As discussed in considerably more detail below, the method of the present invention causes the formation of a crosslinked and functional gel that extends out into and substantially fills the pores of the support. As a consequence, the static and dynamic sorption capacities of the chromatographic media are not limited by the porous surface area of the substrate, as is the case with the pellicular materials of Varady's invention.

With regard to previous techniques for the passivation of inorganic or mineral supports by surface coating treatments, U.S. Pat. No. 4,415,631 to Schutijser discloses a resin consisting of inorganic silanized particles onto which is bonded a crosslinked polymer comprised of copolymerized vinyl monomers and which contains amide groups. The invention specifies that the inorganic porous support, including silica, must be silanized prior to coating. The silanization treatment provides the inorganic porous support with reactive groups so that the copolymer can be covalently bonded to the silica surface.

Nakashima et al., in U.S. Pat. No. 4,352,884, also discloses the use of silica as a porous substrate. The silica is coated with a polymer made up of acrylate or methacrylate monomer and a copolymerizable unsaturated carboxylic acid or a copolymerizable unsaturated amine. Nakashima et al. use an already preformed polymer to coat the support. Furthermore, Nakashima et al., in a separate and distinct step, utilize a crosslinking agent in a subsequent curing process.

The above-mentioned inventions are not completely successful, partly because of the unstable chemical linkage between the silica and the coating. The products of these inventions have the further disadvantages of not only failing to totally suppress the initial non-specific adsorption but also of introducing additional modes of non-specific adsorption.

Tayot et al., in U.S. Pat. No. 4,673,734, disclose a porous mineral support that is impregnated with an aminated polysaccharide polymer that is said to cover the internal surface area of the support. However, since polysaccharides usually have very large molecular weights and their solutions are quite viscous, this process is not highly effective. Coverage of the entire internal surface of the silica substrate is problematic due to incomplete and uneven filling of the pores of the silica substrate by the large polysaccharide molecules.

The steric problems of Tayot's process result from the large size of the polysaccharides employed, the chains of which cannot penetrate completely within the pores of the support. This incomplete penetration results in the creation of a "soft" layer of polysaccharide on the surface of the pore that subsequently causes problems during chromatographic separation. Polysaccharides such as dextran can also spontaneously hydrolyze at low pH, rendering them incompatible with certain cleaning operations that require the column or bed of chromatographic media to be washed with acid, alkaline, or oxidizing agents.

Despite these and other problems associated with the use of inorganic chromatographic supports, the use of mineral compounds such as silica as supports for chromatographic adsorbents is still attractive, because as explained above, chromatographic separations can be performed with such materials at very high flow rates—for example, in very large-scale packed columns or in fluidized beds for industrial operations. What is needed are chromatographic supports characterized by high static and dynamic sorption capacity which exhibit improved chemical stability at alkaline and basic conditions and reduced tendencies to cause non-specific protein adsorption. It is an object of the present invention to provide such supports.

SUMMARY OF THE INVENTION

Accordingly, the present invention provides a passivated porous support comprising a porous solid matrix having interior and exterior surfaces and innate (i.e., inherently present) groups that render the matrix susceptible to undesirable non-specific interaction with biological molecules, and a polymer network derived from a passivation mixture comprising effective amounts of a main monomer, a passivating monomer different from the main monomer, and a crosslinking agent, the mixture having been allowed to come into intimate contact with the surfaces of the matrix for a sufficient period of time such that on polymerization of the mixture the innate groups of the matrix become deactivated, resulting in the minimization or substantial elimination of the above-mentioned undesirable non-specific interactions. As used herein, the terms "support", "chromatographic support sorbent" and "chromatographic media" are used interchangeably and are intended to be equivalent. Also, as used herein, the terms "matrix", "substrate" and "substrate matrix" are used interchangeably and are intended to be equivalent.

The passivated porous supports of the present invention are further characterized by reversible high sorptive capacity for biological molecules including proteins. Furthermore, the passivated porous'supports of the present invention enjoy exceptional chemical stability on exposure to strongly acidic or alkaline media and/or strong oxidizing solutions such as those that are frequently utilized during cleaning of industrial manufacturing equipment.

The primary objective of the present invention concerns the passivation of porous solid matrices that possess innate undesirable groups that render the matrix susceptible to non-specific interactions (e.g., adsorption) with biological molecules, in particular, proteinaceous substances.

A wide variety of non-passivated porous solid matrices are amenable to passivation by the general method of the present invention. These porous matrices include, but are not limited to, (i) mineral oxide supports, (ii) "stabilized" mineral oxide supports rendered chemically resistant to leaching by the application of thin protective coatings of hydrophobic polymers to their surfaces, and (iii) porous matrices comprised solely of organic/polymeric materials, in particular hydrophobic polymers.

For example, mineral oxide supports, such as silica, alumina, and the like, maybe transformed into passivated supports that exhibit desirable characteristics, such as high sorptive capacity, high density and good resolving (chromatographic) properties, unaccompanied by undesirable non-specific interactions that would otherwise be due largely to innate hydroxyl groups present on the surfaces of mineral oxides (e.g., silanols in the case of silica supports). It should be noted that transition metal oxides, such as zirconium, titanium, chromium and iron oxides are considered in the present invention to be within the scope of the term "mineral oxide" supports.

In the case of such mineral oxide supports, the non-specific interactions include either electrostatic interactions, hydrogen bonding, or both. Hence, the passivating monomer (alternatively described herein as the "neutralizing" monomer) is chosen to dampen, "neutralize," or "deactivate" such non-specific binding interactions; that is, one selects a passivating monomer that is capable of interacting with the innate groups of mineral oxide substrates either electrostatically or via hydrogen-bonding or both.

Moreover, in particular embodiments of the present invention, the passivating monomer can also act as the main monomer (i.e., said passivating or neutralizing monomer is chemically identical to the main monomer), but such situations are limited to those in which the neutralizing monomer is an acrylamide-based monomer that possesses at least one polar substituent, preferably an ionizable (e.g., tertiary amino, carboxylic acid, sulfonic acid, etc.) or ionic (e.g., ammonium, phosphate, etc.) substituent. In particular, acrylate-based monomers cannot serve both as the passivating (neutralizing) monomer and as the main monomer—in part, because the acrylate-based monomers are less stable than the acrylamide-based monomers, particularly under strongly acidic or alkaline conditions.

Without wishing to be limited by theory, it is believed that the utilization of a passivating or neutralizing monomer, in combination with the main monomer and crosslinking agent, allows for the formation of a three-dimensional polymer network comprising a thin passivation region or layer that is substantially adjacent to the matrix surface, which polymer network extends into and throughout the porous volume of the substrate matrix and which passivation layer is made up primarily of units of the passivating or neutralizing monomer engaged in interactions with the innate groups of the substrate matrix. This thin passivation region or layer is additionally held in close proximity to the matrix surface by a lattice of main monomer units which extends from the passivation layer to the exposed exterior surfaces of the resulting "passivated" porous support. In addition, the crosslinking agent acts to tether the respective polymeric (or copolymeric) chains to one another, thereby creating a stable three-dimensional polymer (i.e., "gel") network that is surprisingly effective in minimizing or eliminating undesirable non-specific binding interactions between biological molecules and the non-passivated porous solid matrix.

Thus, it is also an object of the present invention to provide a passivated porous support comprising a porous solid matrix having interior and exterior surfaces and innate groups that render the matrix susceptible to undesirable, non-specific interaction with biological molecules, and a polymer network derived from a passivation mixture comprising effective amounts of an acrylamide or methacrylamide monomer further substituted with at least one polar ionic or ionizable substituent, which monomer is capable of functioning both as a main monomer and as a passivating or neutralizing monomer, and a crosslinking agent, the mixture having been allowed to come into intimate contact with the surfaces of the matrix for a sufficient period of time such that on polymerization of the mixture, the innate groups of the matrix become deactivated, resulting in the substantial elimination of the above-mentioned undesirable non-specific interaction. Where porous matrices comprised of hydrophobic polymer substrates (as opposed to mineral oxide matrices) are concerned, it is a further object of the present invention to reduce the non-specific binding associated with exposure of such hydrophobic polymer surfaces to proteinaceous solutions. In particular, porous synthetic polymeric solid matrices comprised of such materials as polystyrene, polysulfone, polyethersulfone, polyolefins (e.g., polyethylene and polypropylene), polyacrylate, polyvinyl acetate (and partially hydrolyzed versions thereof), and the like, exhibit non-specific binding associated with hydrophobic-hydrophobic (among other types, e.g., hydrogen-bonding) interactions. Unlike the case of the mineral oxide matrix, in which the neutralizing monomer component of the passivating mixture is selected to deactivate polar groups like silanols, hydrophobic synthetic polymer matrices are passivated by the incorporation of passivating ("neutralizing") monomers that are capable of associating with and consequently deactivating innate non-polar hydrophobic groups exposed on the matrix surface. The passivating monomers of the present invention adsorb upon (and consequently cover) the hydrophobic groups on the surface by virtue of their containing long-chain saturated hydrocarbons, olefinic hydrocarbon groups, aromatic groups, or like hydrophobic domains that interact with and become appreciably bound to their hydrophobic counterparts on the matrix surface as a consequence of the hydrophobic-hydrophobic interaction between them.

In a further object of the present invention, passivated porous supports exhibiting exceptional stability in alkaline media are provided. These passivated resins comprise porous solid matrices pre-coated with a thin film of a synthetic organic polymer, such as polystyrene or polystyrene substituted with nonionic, ionic, or ionizable functional groups. These pre-coated matrices exhibit the improved characteristics after being subjected to the passivation method disclosed herein.

More particularly, the methods of the present invention can be advantageously applied to the passivation of chromatographic support media comprised of porous mineral oxide particles (e.g., silica and alumina), the interior and exterior surfaces of which have previously been coated with a thin, protective layer of a coating polymer. This protective polymer coating is applied for the purpose of improving the chemical stability of the underlying mineral oxide material (e.g., against leaching or other chemical decomposition at alkaline, acidic, or strongly oxidizing conditions). For example, strongly alkaline aqueous media (e.g., 0.5M sodium hydroxide solutions) are commonly used to clean chromatographic supports, and conventional silica supports can suffer significant weight loss (of order 50%) associated with leaching of the material over repeated cleaning cycles (e.g., 100 cycles).

The leaching of such unprotected mineral oxide supports gives rise to a number of problems, not the least of which is loss of mechanical integrity of the support and a consequent increase in the back pressure exhibited by columns packed with particles of the material. The problem of leaching can be addressed to some extent by using porous matrices characterized by lower surface areas (e.g., 5–10 $m^2/g$), but this is generally undesirable insofar as sorption capacity is often reduced by a corresponding amount.

The approach to substrate stabilization taken in one embodiment of the present invention involves coating the alkaline-sensitive porous mineral oxide substrate matrix with a soluble polymer that substantially encapsulates the mineral oxide matrix and thereby minimizes or prevents contact between the mineral oxide substrate and potentially destructive chemical cleaning solutions (e.g., caustic). The protective polymer coating is applied in the form of a thin surface layer upon the pore wall surfaces in order to avoid significantly decreasing the porous volume or blocking the mouths of pores. The protective polymer coating layer is readily applied, for example, by (i) first dissolving the protective polymer (e.g., polystyrene) in a suitable organic solvent to form a coating solution, (ii) subsequently impregnating the porous mineral oxide matrix with said solution, and then (iii) finally evaporating or otherwise removing the organic solvent.

While it has been discovered that this process of depositing protective polymer coatings upon the porous surfaces of mineral oxide (and particularly silica) matrices can significantly stabilize these materials by sharply reducing their rates of chemical leaching, the approach has the important disadvantage of rendering the porous surfaces of the coated and protected matrices hydrophobic and thus prone to cause excessive non-specific binding of proteins by adsorption. (This is precisely the same problem noted above in connection with entirely polymeric porous support matrices.) However, this problem can be successfully addressed by the methods of the present invention in the same way as the non-specific binding of strictly polymeric support matrices can be reduced—i.e., by passivation in a process of oriented polymerization. More particularly, these composite chromatographic supports (i.e., supports comprised of mineral oxide substrates that have been stabilized by the application of thin protective polymer coatings) can be passivated against excessive non-specific binding by incorporating passivating ("neutralizing") monomers capable of associating with and consequently deactivating innate nonpolar hydrophobic groups exposed on the matrix surface. The passivating monomers useful in this embodiment of the present invention adsorb upon (and consequently cover) the hydrophobic groups on the surface by virtue of their containing long-chain saturated hydrocarbons, olefinic hydrocarbon groups, aromatic groups, or like hydrophobic domains that interact with and become appreciably bound to their hydrophobic counterparts on the matrix surface as a consequence of the hydrophobic-hydrophobic interaction existing between them. Typically, the present invention utilizes base matrices having the following characteristics: an initial average particle size ranging from about 5 to about 1000 microns; an initial porous volume ranging from about 0.2 to about 2 $cm^3/gram$; an initial surface area ranging from about 1 to about 800 $m^2/gram$; and an initial pore size ranging from about 50 to about 6000 angstroms. Preferably, the base matrix is characterized by: an initial average particle size ranging from about 10 to about 300 microns, although passivated supports having narrow particle size ranges, such as about 15–20, about 15–25, about 30–45, about 50–60, about 80–100, and about 100–300 microns, are most preferred. Preferred ranges for other characteristics include an initial porous volume ranging from about 0.8 to about 1.2 $cm^3/gram$; an initial surface area ranging from about 10 to about 400 $m^2/gram$; and an initial pore size ranging from about 1000 to about 3000 angstroms. The density of the porous solid matrix obviously varies with its chemical nature, being higher for mineral oxide (e.g., silica) substrates and lower for polymeric ones (e.g., polystyrene).

The size exclusion limit varies somewhat from one type of passivated porous support to another, but generally falls in the range of about 500 to about 2,000,000 daltons, preferably, 50,000 to about 500,000. The sorptive capacity can also be manipulated, depending on the amount of main monomer incorporated in the polymer network, and ranges between about 1 milligram to about 300 milligrams of solute or biological molecule per unit volume (ml) of passivated support bed—preferably at least about 50 mg/ml, and most preferably about 100 mg/ml.

Yet another object of the present invention relates to the passivation of non-passivated porous solid matrices while maximizing the openness (e.g., gel porosity and pore size) of the resulting passivated porous support. Such open gel morphologies have the advantage of permitting high sorption capacities to be achieved without affording excessive resistance to the transport of solutes such as proteins through the gel. Hence, in particular embodiments of the present invention, the polymerization of the passivation mixture is effected in the presence of an effective amount of a pore inducer.

A number of additives are suitable as pore inducers, including, but not limited to, polyethylene glycol, polyoxyethylene, polysaccharide, and the like. Also, the polymerization of the passivation mixture can be effected in the presence of an effective pore-inducing amount of a polar solvent. For example, the polymerization can be carried out in alcohol, a cyclic ether, a ketone, a tertiary amide, a dialkyl sulfoxide, or mixtures thereof. Preferably, such polar solvents include, but are not limited to, methanol, ethanol, propanol, tetrahydrofuran, dimethylsulfoxide, dimethylformamide, acetone, dioxane, or mixtures thereof.

According to the present invention, polymerization is effected in the presence of an effective amount of a polymerization initiator, for example, thermal initiators such as ammonium persulfate/tertiary amine, nitriles or transition metals. Other examples include 2,2'-azobis(2-amidinopropane) hydrochloride, potassium persulfate/dimethylaminopropionitrile, 2,2'-azobis(isobutyronitrile), 4,4'-azobis(4-cyanovaleric acid), or benzoylperoxide. Photochemical initiators may also be used, such as isopropylthioxantone, 2-(2'-hydroxy-5'-methylphenyl) benzoltriazole, 2,2'-dihydroxy-4-methoxybenzophenone, riboflavin, and the like. Polymerization begins, as is known in the art, e.g., with agitation, exposure to heat, or exposure to a sufficient amount of radiant energy.

It is the object of the present invention to provide further passivated porous supports in which the main monomer of the polymer network comprises a vinyl monomer having at least one polar substituent. Such substituent may further be ionic, non-ionic, ionizable, or in the case of a vinyl monomer having more than one polar substituent, such substituents may be a combination of such Substituents. It is preferred in affinity chromatography that the main monomer on polymerization, as part of the polymer network, have an affinity for a preselected biological molecule. However, the further modification of the polymer network to incorporate specific ligands capable of binding to biological molecules of interest is not precluded.

It should be apparent to one of ordinary skill in the art that the substituent(s) on the passivating or neutralizing monomer responsible for the "deactivation" (i.e., the reduction in the capacity of the innate groups of the non-passivated porous solid matrix to interact in a non-specific manner with biological molecules) should be tailored to the nature of the non-specific interaction to which the non-passivated porous solid matrix is susceptible. In essence, neutralizing monomers are provided which can interact with the innate groups of the matrix surfaces in the same manner as the non-specific interaction (e.g., electrostatically, via hydrogen bonding or both in the case of mineral oxide matrices—or via hydrophobic-hydrophobic interaction in the case of synthetic polymeric matrices). Hence, substituents can be polar, cationic, anionic or hydrophobic depending on the particular application at hand. For example, suitable neutralizing monomers for porous mineral oxide matrices comprise a vinyl monomer having at least one polar ionic or ionizable substituent. In one embodiment of the present invention, the substituent has the capacity to bear a positive charge. In particular, such neutralizing monomers are selected to provide near-surface passivating regions and polymer networks that are effective in deactivating polar groups on the surfaces of non-passivated matrices (e.g., in deactivating hydroxyl groups on the surfaces of porous mineral oxide matrices).

As a non-limiting example, neutralizing monomers useful in the passivation of porous mineral oxide matrices may be selected from diethylaminoethyl methacrylamide, diethylaminoethyl acrylamide, methacrylamido propyltrimethyl ammonium halide, triethylaminoethyl acrylamide, trimethylaminoethyl methacrylate, polyethyleneglycol dimethacrylate, dimethylaminoethyl methacrylate, polyethyleneglycol divinyl ether, or polyethyleneglycol diacrylate. Of these, the first four can function within the same composition both as a main monomer and a neutralizing monomer, as discussed above.

Likewise, suitable passivating monomers for use in the passivation of hydrophobic polymer surfaces—whether said polymer is present as a protective surface coating on a mineral oxide matrix or as the bulk, structural material in the case of a porous polymeric chromatographic support matrix—will typically comprise vinyl monomers having at least one substantially non-polar or hydrophobic substituent. In one embodiment of the present invention, this substituent comprises a hydrocarbon-rich functional group or moiety that imparts hydrophobicity to a portion of the passivating monomer.

In general, the hydrophobic character will result from the presence in the passivating monomer of a saturated (e.g., aliphatic) or unsaturated (e.g., aromatic) hydrocarbon substituent, and may further be described as straight-chain, branched, cyclic, or heterocyclic. Long-chain alkyl functional groups are particularly useful as substituents in this class of passivating monomers, which further contain one or more vinylic, acrylic, acrylamide, or allylic monomers. These passivating monomers are typically employed at concentrations in the reaction mixture of from about 0.1 to 1.0%.

Crosslinking agents useful in the present invention comprise vinyl monomers having at least one other polymerizable group, such as a double bond, a triple bond, an allylic group, an epoxide, an azetidine, or a strained carbocyclic ring. Preferred crosslinking agents having two double bonds include, but are not limited to, N,N'-methylenebis-(acrylamide), N,N'-methylenebis(methacrylamide), diallyl tartradiamide, allyl methacrylate, diallyl amine, diallyl ether, diallyl carbonate, divinyl ether, 1,4-butanedioldivinylether, polyethyleneglycol divinyl ether, and 1,3-diallyloxy-2-propanol.

It is a further object of the present invention to provide a method of passivating a porous solid matrix having interior and exterior surfaces and innate groups that render the matrix susceptible to undesirable non-specific interaction with biological molecules, comprising: (a) contacting the surfaces of the matrix with a passivation mixture comprising effective amounts of a main monomer, a neutralizing monomer different from the main monomer, and a crosslinking agent; and (b) effecting the polymerization of the mixture to form a three-dimensional polymer network within the pores of the matrix, such that the innate groups of the matrix become deactivated, resulting in the substantial elimination of undesirable non-specific interaction.

In the present method the amount of neutralizing monomer is chosen to be sufficient to counteract the innate groups present on the surface of the non-passivated matrix. Furthermore, the surfaces of the matrix are contacted (e.g., by dropwise addition) with a solution of the passivation mixture. Generally, the passivation mixture is prepared as an aqueous solution and, as mentioned above, may in addition contain effective amounts of a pore inducer. In a preferred embodiment of the present invention as it is applied to porous mineral oxide matrices, the volume (in ml) of the passivation mixture solution is adjusted to correspond approximately to the weight (in grams) of the non-passivated porous solid matrix.

Yet another object of the present invention is related to a method of separating a desired biological molecule from a sample containing same comprising: (a) loading a column packed with the passivated porous support having an affinity for a preselected biological molecule with a sample containing the preselected biological molecule; and (b) passing an eluent solution through the loaded column to effect the separation of the preselected biological molecule. The sample may be introduced to the column in any number of ways, including as a solution. Chromatographic separations employing these passivated supports in fluidized-bed modes of operation are also within the scope of the invention.

The methods of the present invention are effective to isolate or separate a broad range of biological molecules, including peptides, polypeptides, and proteins (such as insulin and human or bovine serum albumin), growth factors, immunoglobulins (including IgG, IgM, and therapeutic antibodies), carbohydrates (such as heparin) and polynucleotides (such as DNA, RNA, or oligonucleotide fragments).

Eluent solutions suitable for use in the present invention are well known to those of ordinary skill in the art. For example, a change in ionic strength, pH or solvent composition may be effective in "stepwise" elution processes. Alternately, eluent solutions may comprise a salt gradient, a pH gradient or any particular solvent or solvent mixture that is specifically useful in displacing the preselected biological molecule. Such methods are generally known to those engaged in the practice of protein chromatography. Still another object of the present invention relates to a chromatographic method for the separation of biological molecules comprising passing a sample containing a mixture of biological molecules through a column packed with the passivated porous support disclosed herein.

Moreover, a method of preparing a passivated porous solid support is disclosed comprising: (a) contacting a porous solid matrix, having interior and exterior surfaces and innate groups that render the matrix susceptible to undesirable non-specific interaction with biological molecules, with a passivation mixture comprising effective amounts of a main monomer, a passivating or neutralizing monomer different from the main monomer, and a crosslinking agent; and (b) effecting the polymerization of the mixture to form a polymer network within the pores of said porous solid matrix, such that the innate groups of the matrix become deactivated, to provide a passivated porous solid support that is substantially free of undesirable non-specific interactions.

These and other objects of the present invention will become apparent to those skilled in the art from a reading of the instant disclosure.

| | |
|---|---|
| Column Size: | 1.0 cm ID × 7.8 cm |
| Initial Buffer: | 50 mM Tris-HCl, pH 8.6 |
| Elution gradient: | 0–1 M NaCl |
| Flow Rate: | 125 ml/h |

Figure 1A:
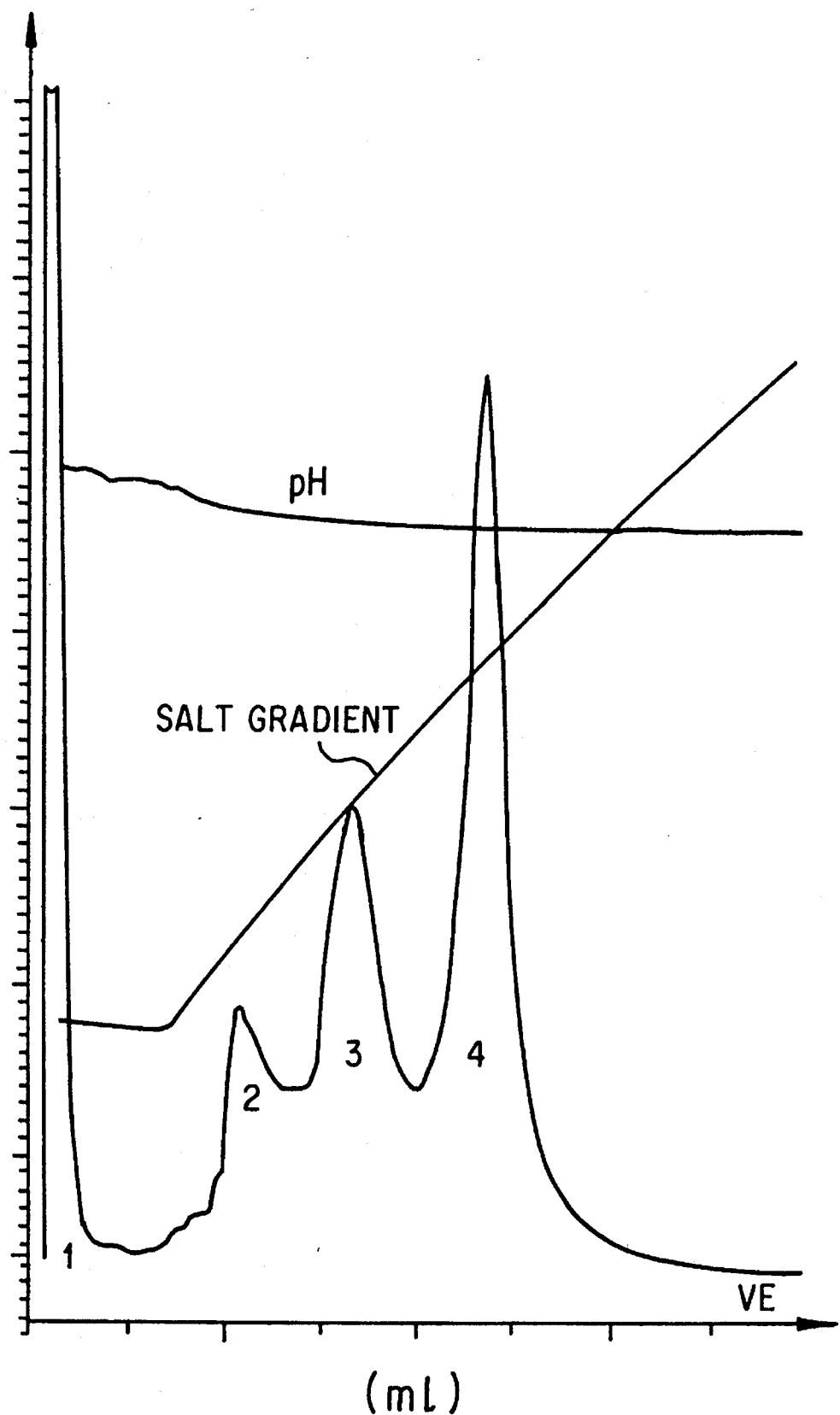
FIG. 1A is a graph which schematically represents the chromatographic separation of a protein mixture consisting of (1) cytochrome, (2) bovine hemoglobin, (3) ovalbumin, and (4) beta-lactoglobin on a cationic passivated porous support. The conditions of the experiment were as follows.
Figure 1B:
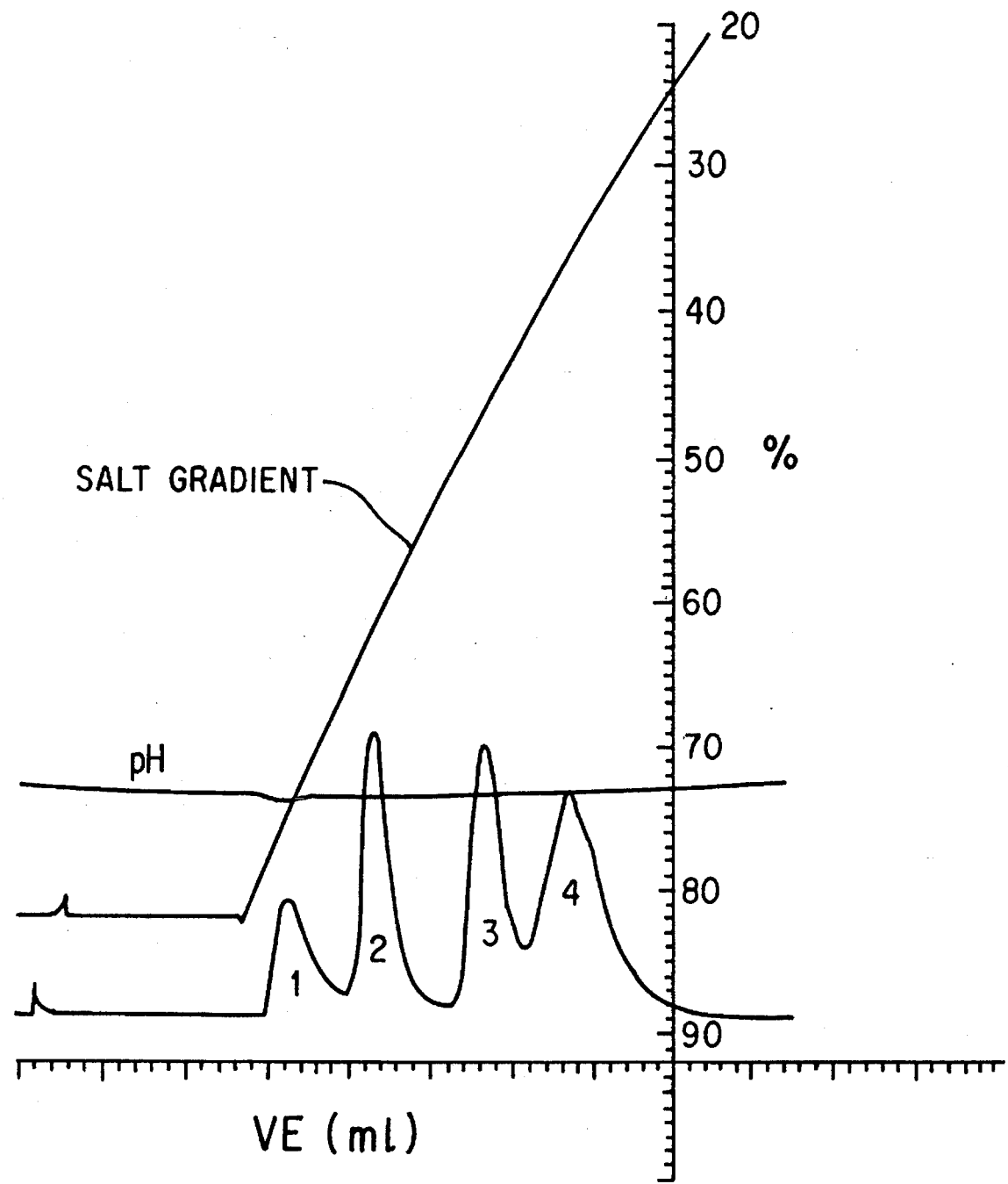

FIG. 1B is a graph which schematically represents the chromatographic separation of a protein mixture consisting of (1) ovalbumin, (2) beta-lactoglobulin, (3) cytochrome c, and (4) lysozyme on an anionic passivated porous support. The conditions of the experiment were as follows:

| | |
|---|---|
| Column Size: | 1.0 cm ID × 7.5 cm |
| Initial Buffer: | 50 mM Acetate, pH 6.5 |
| Elution Gradient: | 0–2 M NaCl |
| Flow Rate: | 150 ml/h |

Figure 2A:
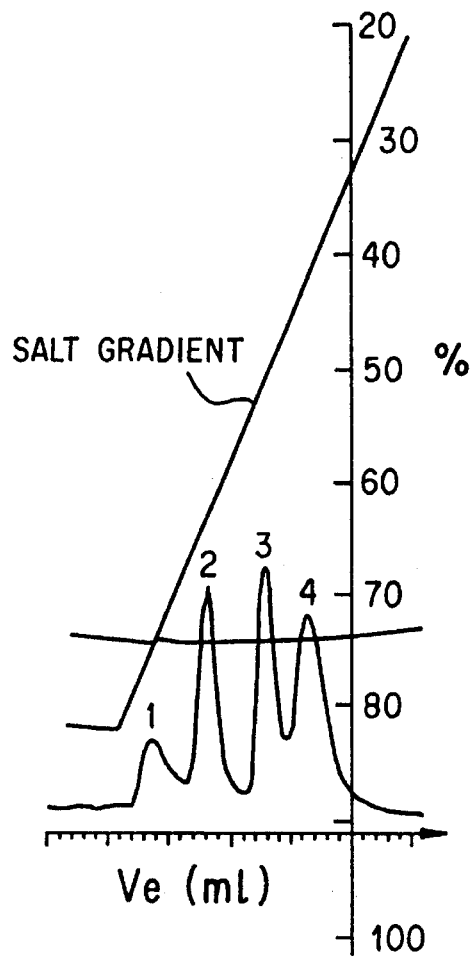
Figure 2B:
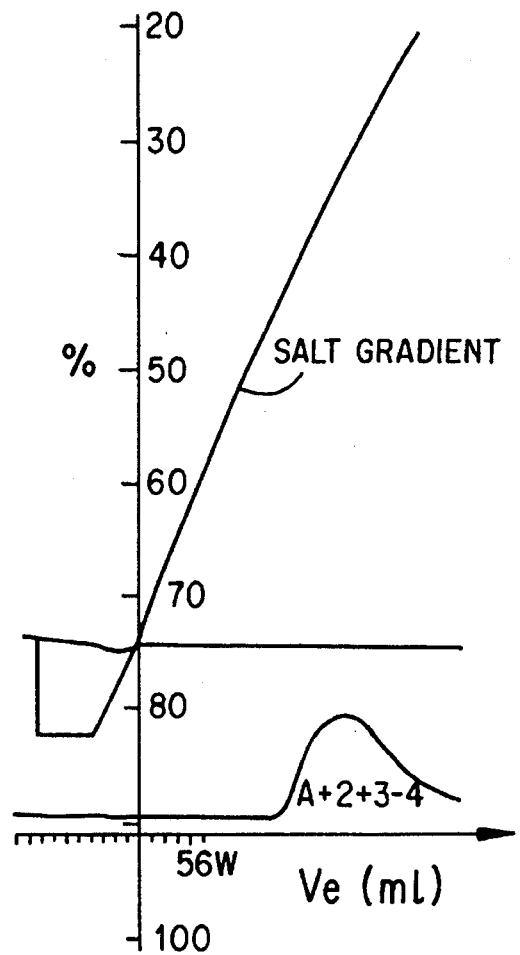

FIG. 2 represents a comparison between the chromatographic separations of a protein mixture consisting of (1) ovalbumin, (2) beta-lactoglobulin, (3) cytochrome c, and (4) lysozyme using an anionic passivated porous support and an anionic nonpassivated matrix. The conditions of the experiment were as follows:

| | |
|---|---|
| First Buffer: | acetate 50 ml, pH 6.5 |
| Second Buffer: | acetate 50 ml, pH 6.5 2 M NaCl, pH 4.5 |
| Flow Rate: | 140 ml/h |

Figure 3A:
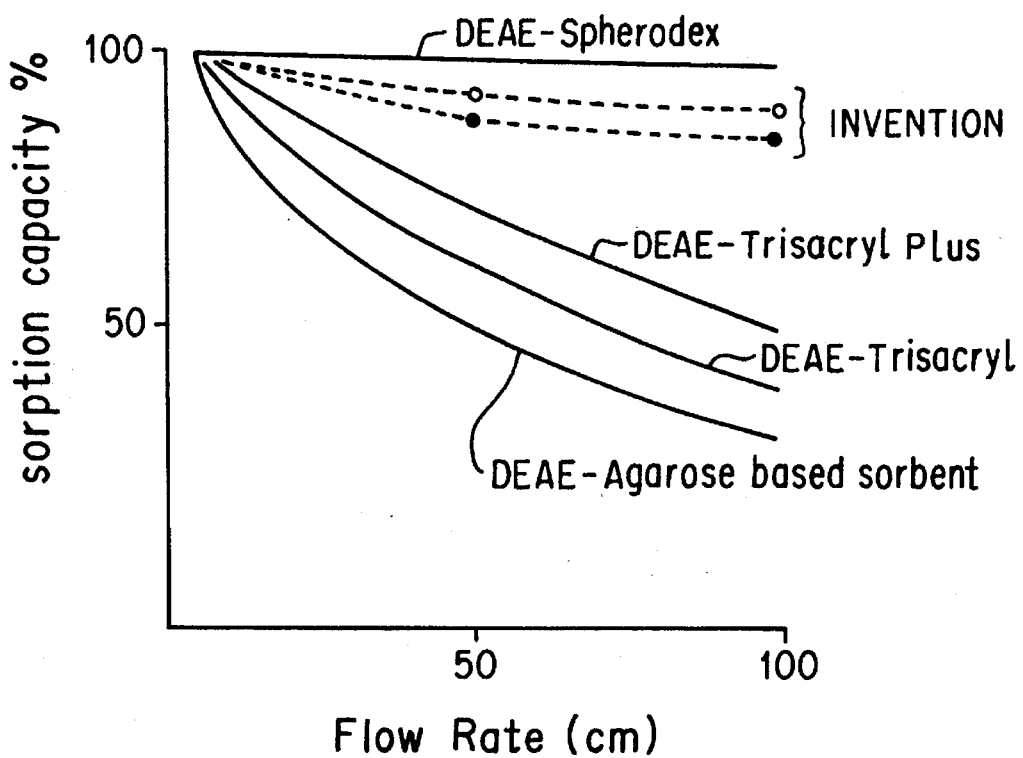

FIG. 3A shows a graph of useful relative sorption capacity versus flow rate for various porous supports including the porous supports of the present invention passivated with a cationically charged polymer network (i.e., a passivated porous support useful as an anion-exchange resin).

Figure 3B:
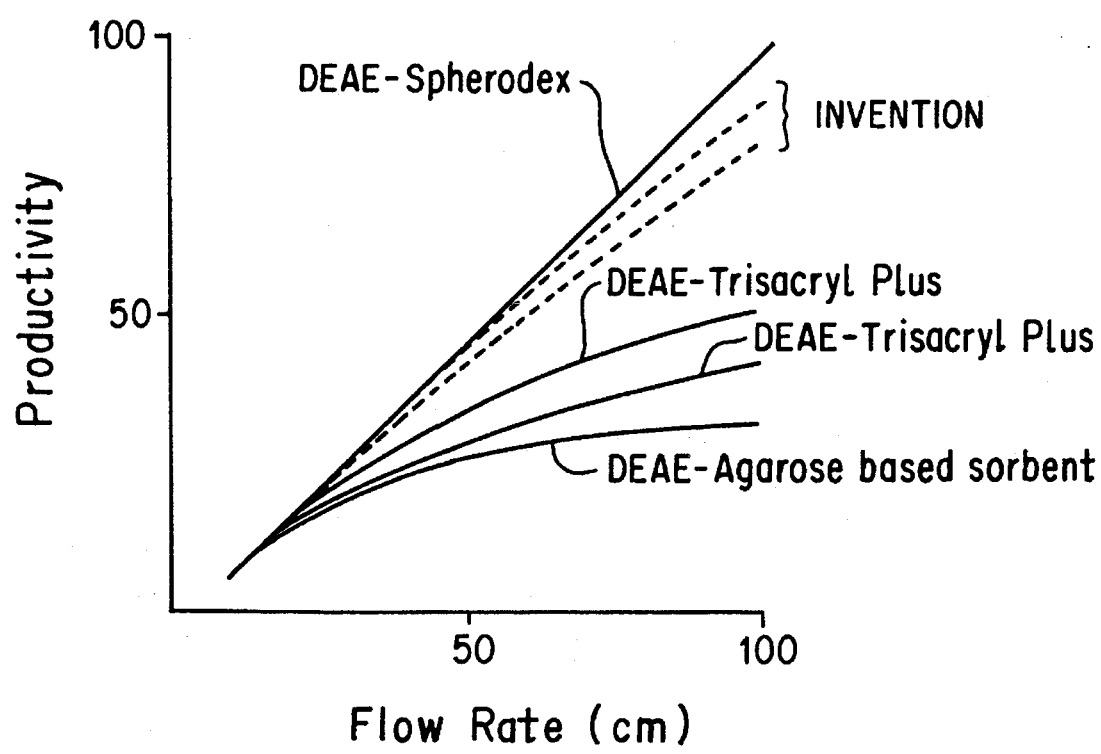

FIG. 3B shows a graph of productivity versus flow rate for the various porous supports shown in FIG. 3A.

Figure 4:
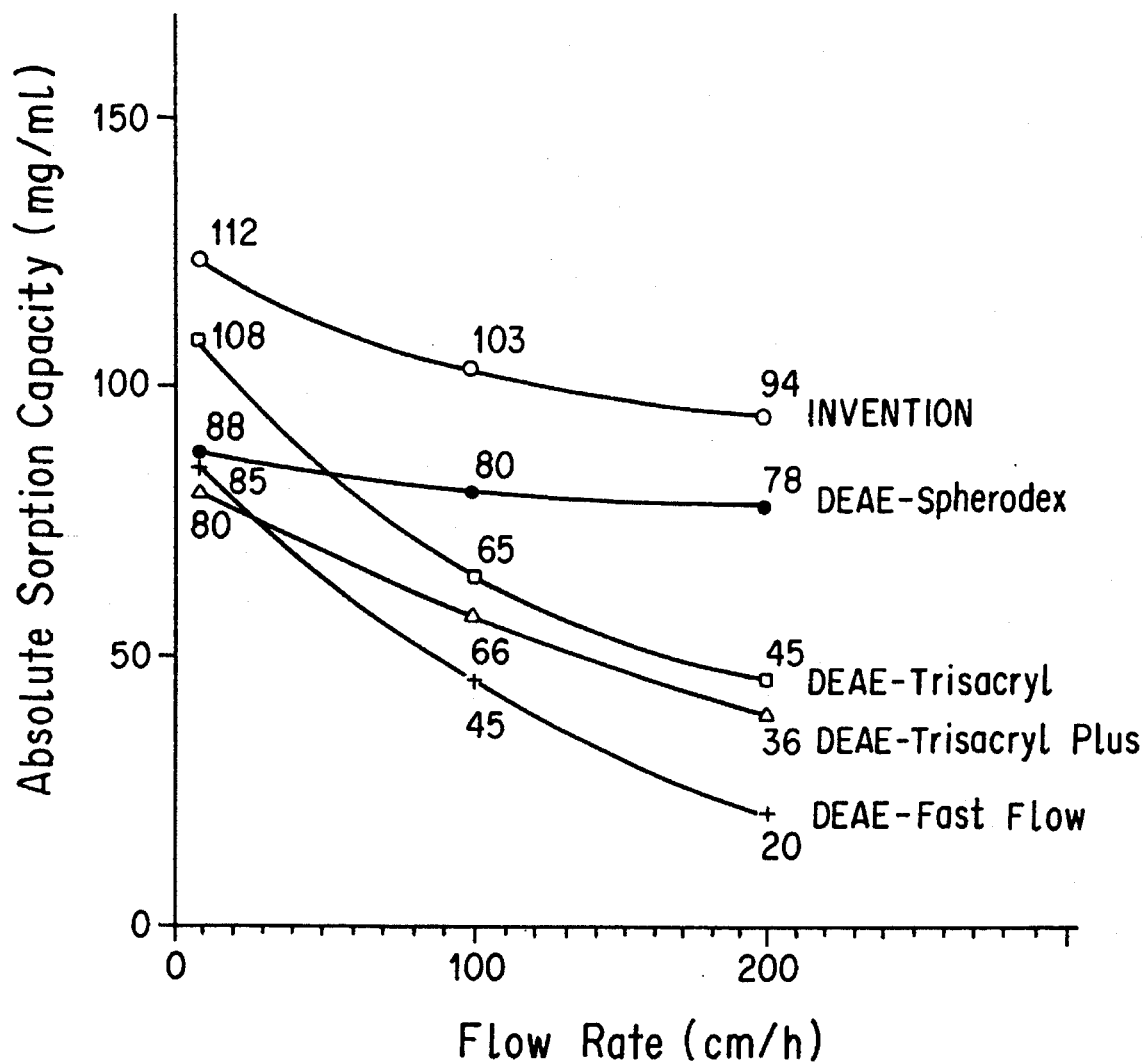

FIG. 4 shows a graph of the absolute sorptive capacity (in mg/ml) as a function of flow rate of a variety of solid supports, including a passivated porous support of the present invention.

Figure 5:
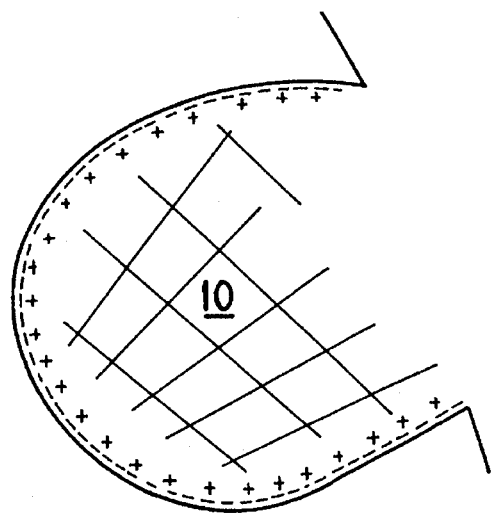

FIG. 5 is a schematic illustration of the putative architecture of the three-dimensional polymer network formed within and extending from the internal surfaces of an individual pore in a porous solid matrix upon polymerization of the passivation mixture of the present invention.

DETAILED DESCRIPTION OF THE INVENTION

The process of the present invention requires first the dissolution of monomers in water or in an aqueous/organic solution.

A primary component of the passivation mixture of the present invention is the main monomer. The appropriate amount of main monomer (or other solute) for use in the present invention is expressed as a percentage equal to the number of grams of main monomer per 100 ml of monomer solution (percent weight/volume). For purposes of the present discussion, the volume of the monomer solution is effectively the volume of the solution of a passivation mixture containing main monomer, neutralizing monomer, and crosslinking agent. Appropriate concentrations of the main monomer range from about 5% to about 50% (i.e., 5–50 grams of main monomer per 100 ml of monomer solution). Preferred concentrations of the main monomer are from about 7% to about 20%.

For purposes of this application, the main monomer is defined as including any monomer known to those skilled in the art which can be utilized for the preparation of an adsorbent useful in a chromatographic separation (e.g., affinity, ion-exchange, and the like). Such monomers include, but are not limited to, non-ionic monomers, ionic monomers, hydrophilic monomers, hydrophobic monomers, and reactive monomers. Reactive monomers are monomers having special functional groups that enable them to react chemically with other molecules that are subsequently immobilized irreversibly on the polymer network. This procedure is the basis of affinity chromatography, the chemically attached molecule being referred to as the "ligand." The main monomers of the present invention can be aliphatic, aromatic or heterocyclic; however, they must possess a polymerizable double bond; for example, the main monomers can be acrylic, allylic, vinylic or the like.

More specifically, anionic polymers are used to create anionic sorbents (i.e., cation-exchange supports). The functional groups (i.e., the substituents on the vinyl monomer) are preferably: carboxylic groups (e.g., acrylic acid, N-acryloyl-aminohexanoic acid, N-carboxymethylacrylamide), sulfonate groups (e.g., acrylamidomethyl-propane sulfonic acid), or phosphate groups (e.g., N-phosphoethyl-acrylamide).

Cationic polymers used to create cationic sorbents may contain the following functional groups: substituted amino groups (e.g., diethylaminoethyl methacrylamide, diethylaminoethyl acrylamide, methacrylamidopropyltrimethylammonium halide, triethylaminoethyl acrylamide, trimethylaminoethyl methacrylate, polyethyleneglycol dimethacrylate, dimethylaminoethyl methacrylate, polyethyleneglycol divinyl ether, or polyethyleneglycol methacrylate), or heterocyclic amines (e.g., 2-vinylpyridine, vinylimidazole, 4-vinylpyridine). Nonionic polymers may be comprised of: acrylamide, hydroxy-containing acrylamide derivatives (e.g., N-tris-hydroxymethyl-methyl-acrylamide, methylolacrylamide, dimethylacrylamide, 2-hydroxyethylacrylamide, N-acryloylmorpholine), methacrylamide, hydroxy-containing methacrylamide derivatives, heterocyclic neutral monomers (e.g., vinylpyrrolidone, N-acryloylmorpholine), or hydroxy-containing acrylates and methacrylates (e.g., hydroxyethylacrylate or hydroxyethyl methacrylate, hydroxyphenyl methacrylate, 4-vinylphenol, and 2-hydroxypropylacrylate).

Hydrophobic monomers useful in creating sorbents for hydrophobic chromatography include octyl-acrylamide or -methacrylamide, phenyl-acrylamide, butyl-acrylamide, benzylacrylamide, and triphenylmethyl-acrylamide.

Activated monomers useful in creating preactivated sorbents (i.e., those that can be further derivatized directly with a "ligand") for affinity chromatography include glycidylacrylate or -methacrylate, acrolein, acrylamidobutyraldehyde dimethylacetal, acrylic-anhydride, acryloyl chloride, N-acryloxysuccinimide, and allyl-chloroformate.

The passivation mixture further comprises an appropriate amount of a passivating or neutralizing monomer capable of neutralizing the non-specific adsorption properties of innate sites on the surface of the porous solid support. In the case of silica, the acidic character of innate silanol groups proves problematic during separations, and it is thus desirable to neutralize these silanol groups. The amount of neutralizing monomer to be used is preferably an amount sufficient to counteract approximately up to an equivalent number of Si—OH groups present at the exterior and interior surfaces of said support. The amount of neutralizing monomer, again expressed as a percentage (weight/volume), should be about 0.5% to about 6% (w/v), preferably about 1.5% to about 3% (i.e., about 1.5–3 grams of neutralizing monomer per 100 ml of monomer solution).

Suitable neutralizing monomers for use in the present invention may be monomers bearing a positive charge at a neutral pH; examples include monomers containing a cationic amine group, such as substituted amines or pyridine and the like. The cationic neutralizing monomers must have at least one double bond, such as vinyl, acrylic, or allylic monomers.

To counteract the acidic character of silica and its tendency to form hydrogen bonds, cationic monomers or monomers which are able to engage in hydrogen bonding (dipolar interactions) are also useful as neutralizing monomers in a particular embodiment of the present invention.

Preferred neutralizing cationic monomers of the present invention include, but are not limited to, diethylaminoethyl acrylamide, diethylaminoethyl methacrylamide, diethylaminoethyl methacrylate, methacrylamide propyltrimethyl ammonium halide, triethylaminoethyl acrylamide, triethylaminoethyl methacrylate and copolymers thereof.

Polyoxyethylene-containing monomers can also be used. This latter group can interact with polar groups (via hydrogen bonding). Preferred neutralizing monomers able to induce hydrogen bonding are polyoxyethylene monomers like poly(ethylene glycol)n-dimethacrylate, where "n" is between about 50 and about 1000.

Preferred neutralizing hydrophobic monomers include, but are not limited to, N-alkylacrylamide in which the alkyl groups are branched, N-alkylacrylamide methylene chains having up to about 20 carbon atoms in the alkyl moiety, and N-arylacrylamide derivatives, like N-benzylacrylamide, N,N-(1,1-dimethyl-2-phenyl)ethyl-acrylamide, N-triphenyl methylacrylamide, or N,N-dibenzyl acrylamide. Specific representative passivating monomers useful in treating polymeric or polymer-coated matrices include, but are not limited to, N-tert-octylacrylamide (TOA), N-(1-methylundecyl)-acrylamide (MUA), N-(1,1,3,5-tetramethyl)-octylacrylamide (TMOA), Triton-X-100-methacrylate (TWMA) i.e., a methacrylate of an octylphenoxy polyethoxyethanol available commercially from Union Carbide Corp. under the tradename Triton-X-100, and polyethyleneglycol-dimethacrylate (PEG-DMA). Hydrophobic adsorption sites present on the internal surfaces of some organic (i.e., polymeric) porous matrices like polystyrene—or on protective polymer coatings deposited on porous mineral oxide matrices—are neutralized using hydrophobic passivating monomers incorporating these aromatic and aliphatic hydrophobic moieties or substituents.

To the mixture comprising the neutralizing and main monomers, a bifunctional crosslinking agent is added. The crosslinking agent allows the three-dimensional insoluble polymeric network to form within the pore volume of the porous matrix. In the absence of the crosslinker called for in this invention, the polymer formed would be linear and thus soluble. The amount of crosslinking agent should be about 0.1% to about 10% (w/v). Alternatively, the amount of crosslinking agent can be calculated based on the total weight of main monomer and neutralizing monomer in use. Preferably, the amount of crosslinking agent is from about 3 to about 10 percent by weight of the total weight of main and neutralizing monomers.

The crosslinking agents used in the present invention are acrylic, vinylic or allylic monomers that possess at least two polymerizable functional groups. Preferred crosslinking agents have at least two double bonds and include, but are not limited to, N,N'-methylene-bisacrylamide, N,N'-methylene-bismethacrylamide, diallyl tartradiamide, allyl methacrylate, diallyl amine, diallyl ether, diallyl carbonate, divinyl carbonate, divinyl ether, 1,4-butanedioldivinylether, and 1,3-diallyloxy-2-propanol.

Thereafter, said mixture is admixed with a porous solid matrix, thereby filling the pores of the matrix. As regards inorganic support materials, suitable porous mineral oxide matrices used in the present invention include but are not limited to silica, alumina, transition metal oxides (including but not limited to titanium oxide, zirconium oxide, chromium oxide, and iron oxide) and any other similar ceramic material including silicon nitride and aluminum nitride. The preferred mineral moieties of the present invention include silica, zirconium oxide, and titanium oxide. The most preferred mineral moiety is porous silica of a particle size of about 5 µm to about 1000 µm, having a porous volume of about 0.2 to about 2 $cm^3/g$, a pore size of about 50 to about 6000 Å, and a surface area of about 1 to about 800 $m^2/g$. At this time, most all of the aqueous solution will have been absorbed by the mineral support, leaving a substantially dry, solid porous matrix.

After filling the pores of the porous mineral oxide matrix, (e.g., silica) with the aqueous solution of monomers (preferably, the volume of the solution expressed in mls is approximately equal to the weight in grams of the silica matrix), the mixture is placed in a non-aqueous dispersing medium. Suitable non-aqueous media include non-polar organic solvents known to those skilled in the art. Such non-aqueous media for suspending the treated matrix may include, but are not limited to, mineral and vegetable oils, aromatic solvents, aliphatic low molecular weight solvents, or chlorinated solvents. The most preferred non-aqueous media include toluene, methylene chloride, and hexane.

Thereafter, a polymerization starter is added to the mixture, now in a non-aqueous medium, in order to initiate polymerization of the monomers within the silica pores. The concentration of initiator(expressed as percent weight per volume of initial monomer solution) is from about 0.1% to about 2%, preferably about 0.8% to about 1.2%.

It should be apparent to those of ordinary skill that certain initiators are best dissolved in aqueous media while others can be dissolved in organic media. Hence, depending on the solubility characteristics of a particular initiator or combination of initiators, the polymerization initiator can be added to the initial solution of passivation mixture prior to addition of that mixture to the porous solid matrix. In particular, an initiator combination of ammonium persulfate and tetramethylethylenediamine (TMEDA) can be introduced separately. One component (the water-soluble persulfate salt) is combined with the aqueous mixture of main monomer, neutralizing monomer, and crosslinking agent, while the other component (TMEDA) is combined with the non-aqueous dispersing medium.

It should be noted that the persulfate/TMEDA combination is particularly useful because TMEDA displays appreciable solubility in water. Hence, in the dispersion comprised of the treated support, water and non-aqueous solvent, the TMEDA is able to penetrate the pores of the treated support and thereby initiate polymerization, particularly upon heating.

Typical polymerization initiators known to those skilled in the art can be used in the present invention. For instance, these initiators may be capable of generating free radicals. Suitable polymerization starters include both thermal and photoinitiators. Suitable thermal initiators include, but are not limited to, ammonium persulfate/tetramethylethylene diamine (TMEDA), 2,2'-azobis-(2-amidino propane) hydrochloride, potassium persulfate/dimethylaminopropionitrile, 2,2'-azobis(isobutyronitrile), 4,4'-azobis-(4-cyanovaleric acid), and benzoylperoxide. Preferred thermal initiators are ammonium persulfate/tetramethyethylenediamine and 2,2'-azobis(isobutyronitrile). Photoinitiators include, but are not limited to, isopropylthioxantone, 2-(2'-hydroxy-5'-methylphenyl)benzotriazole, 2,2'-dihydroxy-4-methoxybenzophenone, and riboflavin. It is further contemplated that riboflavin be used in the presence of TMEDA. When using the combination of persulfate and tertiary amine, the persulfate is preferably added prior to the addition of the non-aqueous medium, since persulfate is much more soluble in water than in non-aqueous dispersing media.

In another embodiment, the polymerization step can take place in the presence of a pore inducer. The pore inducers of the present invention allow polymerization to take place without substantially reducing the porosity of the solid support. Suitable pore inducers, also referred to as porogens, used in the present invention include, but are not limited to, polyethylene glycols, polyoxyethylenes, polysaccharides such as dextran, and polar solvents. Polar solvents include those commonly used in chemical synthesis or polymer chemistry and known to those skilled in the art. Suitable polar solvents include alcohols, ketones, tetrahydrofuran, dimethylformamide, and dimethysulfoxide. Preferred polar solvents are ethanol, methanol, dioxane, and dimethysulfoxide.

Porous polymeric matrices amenable to passivation by the methods of the present invention include, but are not limited to, polystyrene, polysulfone, polyethersulfone, various cellulose esters (e.g., cellulose acetate, cellulose nitrate), polyolefins (e.g., polyethylene and polypropylene), polyvinylacetate (and partially hydrolyzed versions thereof), polyacrylates, polyvinylidene fluoride, polyacrylonitrile, polyamides, polyimides, and various blends, mixtures, and copolymers thereof. Procedures for the manufacture of porous particles and other structures (e.g., microporous membranes) from such polymers are generally known in the art.

Where the polymer surface to be passivated is in the form of a thin, protective coating residing upon the pore walls of mineral oxide substrate that is thus stabilized against leaching, the polymer will generally consist of a linear, high-molecular-weight polymer capable of being dissolved in a suitable organic solvent. For example, a coating solution of linear polystyrene (e.g., with an average molecular weight 400 kilodaltons) is conveniently prepared by dissolving the polymer in a chlorinated hydrocarbon such as methylene chloride. Typical concentrations of polymer in the coating solution range from about 2% (w/v) to about 20% (w/v). The ideal concentration is determined by achieving a balance between effectiveness in preventing or minimizing leaching of the mineral oxide substrate (which argues for higher polymer concentrations) and the constriction of pores and partial loss of porous volume (and sorption capacity) that can occur at higher polymer concentrations. Where protective coatings of polystyrene are deposited on porous silica, a polystyrene concentration of about 10% (w/v) is preferred. The coating is applied by first impregnating the porous support with the solution of protective coating and then removing the solvent vehicle by evaporation.

Certain modifications to the passivation procedures employed with porous mineral oxide matrices are indicated where the exposed surface of the porous matrix to be passivated is a polymeric one—i.e., in those cases where (i) the porous support particle is fashioned entirely of a polymer or (ii) a mineral oxide matrix is protected by a stabilizing polymer coating. In these situations, polymerization of the passivating mixture by the process described above, entailing the dispersion of the porous particles (impregnated with aqueous monomer solution) in a non-aqueous (i.e., "oil-phase") dispersing medium, has certain disadvantages. The problems stem from the fact that the surfaces of polystyrene-coated silica and other polymer-coated mineral oxide matrices are predominantly hydrophobic and compatible with oil-phase dispersing agents that would otherwise be used in the polymerization step. Oil-phase dispersing media are prone to penetrating the pores of matrices that present exposed polymeric surfaces, and the presence of oil inside the pores causes various manufacturing problems (e.g., partial solubilization of the coating polymer, difficulty in effecting removal of the oil from the pores, etc.).

Accordingly, a modified polymerization procedure is advantageously employed where polymeric surfaces are to be passivated, which procedure entails a so-called "dry polymerization" procedure as opposed to that described above involving an oil-phase dispersing medium. In particular, the porous matrix impregnated with aqueous passivating mixture (i.e., monomer solution) undergoes the polymerization reaction while in the form of an apparently "dry" and free-flowing powder, typically agitated (e.g., by stirring or fluidization) in a closed, inert (e.g., nitrogen) atmosphere. The dry polymerization reaction is typically conducted at a temperature from about 60° to 90° C., at a pressure of 1 to 2 bars, and for a period ranging from about 2 hours to overnight.

Suitably "dry" but monomer-solution-impregnated powders can be prepared by adding the aqueous passivating mixture in a careful, metered fashion (e.g., dropwise) to the porous matrix, so that little or no excess liquid-phase passivating mixture is present. The incorporation of organic cosolvents (e.g., ethanol, dimethylsulfoxide, and the like) in the monomer mixture assists the process of wetting the polymeric or polymer-coated mineral oxide matrix by the predominantly aqueous passivation mixture. For example, the crosslinking agent is conveniently added to the final monomer mixture in the form of an aqueous 10% ethanol solution.

Because no oil-phase is present as a dispersing medium in this embodiment of the invention, the initiators (i.e., polymerization catalysts) employed in this dry polymerization process are necessarily water-soluble and are generally thermally activated. A representative thermally-activated polymerization initiator is azo-bis-amidinopropane.

In yet another aspect of the invention, polymeric and polymer-coated mineral oxide matrices may be treated with hydrophilic polymers such as polyoxyethylene (POE) and polyvinylpyrrolidone (PVP) prior to effecting the polymerization and crosslinking of the monomer solution within the pores of the support. Treatment in this manner can be effective in reducing non-specific-binding interactions with proteins even in the absence of the oriented polymerization of hydrophobically binding passivating monomers present in the monomer soluton. Without wishing to be limited as to theory, it is believed that such high-molecular-weight passivating polymers are initially adsorbed upon the surfaces of the polymeric or polymer-coated mineral oxide matrix. Upon polymerization of the monomer solution, these polymers become substantially immobilized by the formation of an interpenetrating polymer network. That is, the POE or PVP polymer becomes entrapped in a "sandwich" type of structure between the pore-wall surface and the three-dimensional polymer lattice that occupies most of the porous volume.

In all cases, i.e., whether the porous matrix is comprised of a mineral oxide, a polymer-coated and thus stabilized mineral oxide, or a polymer, the polymerization process of the present invention creates a three-dimensional lattice or crosslinked polymer network that extends away from the pore-wall surfaces of the porous solid matrix. Again, not wishing to be limited by theory, it is believed that this polymer network is comprised of a thin passivating region or layer that interacts with the surface of the non-specific adsorption sites of the solid support (e.g., silanols in the case of silica) covalently linked with a three-dimensional structural polymer lattice that substantially fills the porous volume. The three-dimensional shape of the polymer lattice is believed to be substantially identical to the shape of the pore which it fills (see FIG. 5), with the passivating layer oriented adjacent to and continuous (i.e., covalently linked) to the three-dimensional polymer lattice that extends away from the matrix surface. This configuration prevents "neutralizing" or "deactivating" pieces of the polymer network from eluting from the support during regular use—for example, when the passivated porous support is exposed to vigorous washing or cleaning conditions, such as high acidic pH, high alkaline pH, high ionic strength, and strong oxidizing conditions. This crosslinked polymer network creates a novel chromatographic sorbent which can then be used, for example, in a process for separating and purifying various biomolecules, including macromolecules.

Indeed, it has been surprisingly discovered that the passivated porous supports of the present invention manifest chromatographic characteristics that are unparalleled under several criteria, particularly in terms of dynamic sorptive capacity as a function of flow rate. In particular, whereas the great majority of porous materials suffer a marked decrease in useful sorptive capacity as flow rates increase (e.g., at flow rates of about 50 cm/h or greater), the passivated porous supports of the present invention show little decrease in useful sorptive capacity from a static condition up to flow rates approaching 200 cm/h. Compare, for example, the behavior of prior art "gel"-type materials with the supports of the present invention, as illustrated in the graphs of FIG. 3A, 3B, and 4 (described further in Example 16).

Moreover, the absolute capacities of the passivated porous supports of the present invention are considerably greater than even those attained with other types of solid supports (e.g., Spherodex™) that exhibit a similar insensitivity to high flow rates. Thus, as shown in FIG. 4, a plot of the absolute capacity vs. flow rate of various solid supports unambiguously shows that the passivated solid supports of the present invention combine a very high absolute sorption capacity (expressed as mg/ml) with a relative insensitivity to solution flow rates.

It is believed, without wishing to be limited by theory, that a highly open, flexible lattice structure comprised primarily of polymeric chains of repeating main monomer units is formed within the pores of the porous solid matrix. Very significantly, it is believed that the areas of the porous support available for desirable reversible interaction with biological molecules are not confined to the regions immediately adjacent to the surface of the pore as is the case when thin, substantially two-dimensional coatings are applied to porous surfaces in the manner of Steuck (U.S. Pat. No. 4,618,533) and Varady et al. (U.S. Pat. No. 5,030,352) as discussed in Section 2.2 above. Rather, it is believed that the polymeric network of the present invention extends outwardly into the pore volume itself in the manner of a three-dimensional lattice, as opposed to a two-dimensional coating limited strictly to the pore wall surface area. A schematic diagram of such a structure, as it is thought to exist, is illustrated in FIG. 5, where a biological molecule of interest (depicted as a spherical object) is also shown interacting with the lattice. Furthermore, the presence of porogens (pore-inducers) in the passivation mixture is believed to promote creation of this open three-dimensional polymer network.

It is further thought that such an extended polymer network contributes not only to the unusually high absolute sorptive capacity of the passivated solid supports of the invention as measured under static (i.e., no flow) conditions, but also allows the present invention to maintain such high sorptive capacities largely independent of solution flow rates. It is thought that perhaps the open, flexible nature of the three-dimensional polymer network allows biological molecules to rapidly penetrate the polymer lattice and thereby efficiently interact with Sorptive groups in the polymer network of the passivated porous support even at high solution flow rates. The rapid and efficient mass transfer of biomolecules into and through this network avoids the decrease in useful or dynamic sorption capacity and resolution that are typical of conventional chromatographic media. With these conventional media, diffusion in the pores of the support and/or materials coated thereupon or within them leads to poor mass transfer rates and limits the efficiency of the chromatographic process.

Thus, a method of performing chromatographic separations characterized by high sustained sorptive capacity independent of flow rate and rapid, efficient mass transfer is achieved with the passivated porous supports of the present invention, which supports include an open, flexible three-dimensional network or lattice of crosslinked polymer chains extending within and throughout the pores of the support matrix.

The separation and purification process usually involves at least two steps. The first step is to charge a packed or fluidized bed column containing the passivated porous solid support with a solution containing a mixture of biomolecules, at least one of which it is desired to separate and recover in at least partially purified form. The second step is to pass an eluent solution through said column to effect the release of said biomolecules from the column, thereby causing their separation.

"Stepwise" elution can be effected, for example, with a change in solvent content, salt content or pH of the eluent solution. Alternatively, gradient elution techniques well known in the art can be employed. For instance, proteins reversibly bound to cation exchange media can generally be eluted by increasing the pH to alkaline values (subject to limits associated with the chemical stability of the protein), and immunoglobulins bound to protein A or like adsorbents may be eluted by decreasing the pH to acidic values.

The invention is further defined by reference to the following examples that describe in detail the preparation of the passivated porous solid support and the methods of using the same. It will be apparent to those skilled in the art that many modifications, both to materials and methods, may be practiced without departing from the purpose and scope of this invention.

EXAMPLES

6.1 GENERAL DEFINITIONS

To better understand the procedures described in the following examples, several terms are defined for the benefit of the reader, below.

The passivation level is an estimation of the absence of non-specific adsorption of a strong cationic molecule like lysozyme, which characteristically forms very strong complexes with silanols on the silica surface.

Porosity factor is the ratio between elution volume (Ve) of a protein (e.g., BSA in our case) and the total volume (Vt) of the packing bed determined under physiochemical conditions (e.g., high ionic strength) in which no interaction exists between the protein and the porous support.

Sorption capacity is the amount of adsorbed protein in "mg" per unit volume (ml) of passivated porous support bed determined under particular Conditions:

| |
|---|
| for cationic sorbents: 50 m M Tris-HCl, pH 8.6. |
| for anionic sorbents: 50 mM Acetate, pH 6.5. |

Ion exchange capacity is the number of ionizable groups in µeq per unit volume (ml) of passivated porous support bed determined by titration.

EXAMPLE 1

Preparation of a porous cation-exchange resin.

20 grams ("g") of acrylamidomethyl propane sulfonic acid (AMPS) sodium salt and 1 g of N,N'-methylene-bisacrylamide (MBA) are dissolved in 50 ml of distilled water. 3 g of diethylaminoethyl methacrylamide, are added and then the pH of the total solution is adjusted to between 6 to 8 to make a final solution volume of the passivation mixture of 100 ml. To this solution of monomers, 500 mg of ammonium persulfate are added at room temperature.

While shaking, the solution of monomers is added dropwise to 100 g of porous silica (40 to 100 µm diameters, 1000 to 1500 Å pore diameter, 20 to 35 $m^2/g$ surface area and 1 $cm^3/g$ porous volume).

After 30 minutes of shaking, 250 ml of paraffin oil is added, the agitated suspension is heated at 60° to 70° C. and then 1 ml of N,N,N',N'-tetramethylethylene diamine is added.

After a few minutes, the exothermic polymerization reaction occurs. The resin is then separated by a chlorinated solvent and dried at room temperature. Lastly, the resin is washed extensively with dilute hydrochloric acid, dilute sodium hydroxide and 1M sodium chloride.

This cation-exchange resin shows the following characteristics:

A titration curve with an acidic pK due to the presence of sulfonic acid groups;

No presence of anionic groups which are oriented on the acidic silanols of the silica surface.

A number of acidic groups of 395 µeq/ml.

A sorption capacity for insulin in 70% ethanol of about 80 mg/ml.

An exclusion limit of about 30 Kd.

EXAMPLE 2

Preparation of an anion-exchange resin.

20 g of methacrylamidopropyl trimethyl ammonium chloride (MAPTAC) and 1 g of N,N'-methylene-bis-acrylamide (MBA) are dissolved in 80 ml of distilled water and the pH of the solution is adjusted to 7.5. Separately, 1 g of ammonium persulfate is dissolved in 20 ml of distilled water. The two solutions were then mixed together at room temperature.

While shaking, the monomer solution is added dropwise to 100 g of dry porous silica (40–100 µm bead diameter, 1000–1500 Å porous volume, 20–35 $m^2/g$ surface area and 1 $cm^3/g$ porous volume).

After shaking for about 30 minutes, 250 ml of paraffin oil is added and the mixture heated at 60°–70° C. 2 ml of N,N,N',N'-tetramethylenediamine is added to polymerize the monomer solution inside the silica pores.

The same recovery and washing steps are performed as those described in Example 1.

The obtained resin shows the following characteristics:

Ion-exchange capacity: 114 µeq of quaternary ammonium groups per ml of resin.

No visible presence of acidic (silanol) groups on titration curve.

No non-specific adsorption of cytochrome c at pH below its isoelectric point.

Sorption capacity for bovine serum albumin (BSA): 91 mg/ml resin.

Porosity factor for BSA ($V_e/V_t$): 0.52.

EXAMPLE 3

Preparation of a second anion-exchange resin using different amounts of cross linker.

Three 80 ml solutions each containing two monomers (MAPTAC and MBA) are prepared according to Example 2, using varying amounts of MBA: 0.5 g, 1 g and 2 g.

All other operations are identical to Example 2. The anion-exchange resins differ by the following properties:

| Amount of MBA | 0.5 g | 1 g | 2 g |
|---|---|---|---|
| Ionic charges per ml of resin | 36 µeq | 114 µeq | 218 µeq |
| Sorption capacity per ml (BSA) | 35 mg | 91 mg | 72 mg |

EXAMPLE 4

Preparation of an anion-exchange resin using MBMA as a crosslinker.

1 g of N,N'-methylene-bis-methacrylamide (MBMA) is dissolved in 50 ml of dimethylsulfoxide (DMSO). To this mixture 40 ml of an aqueous solution containing 20 g of MAPTAC is added.

While stirring, 1 g of ammonium persulfate previously dissolved in 10 ml of distilled water is added. The obtained monomer solution is then used to fill the silica pores (1 cm³/g porous volume; 1200–1500 Å pore diameter) and the resin is prepared according to the previous examples except toluene is used as the non-aqueous solvent instead of paraffin oil.

The obtained anion-exchange resin shows the following characteristics:

Ion-exchange capacity: 201 µeq of quaternary amino groups per ml of resin.

Sorption capacity for BSA: 112 mg/ml.

No non-specific adsorption of cationic proteins like cytochrome c are present.

Porosity factor for BSA ($V_e/V_t$): 0.53

EXAMPLE 5

Preparation of anion-exchange resins with a different-amount of MBMA.

Three different resins are prepared according to Example 4 with differing amounts of MBMA as a crosslinking agent.

When 100 ml of a DMSO-water solution is used, the amount of MBMA is varied as follows: 0.5 g, 1 g and 2 g. Paraffin oil is used as the non-aqueous (organic) solvent at 60° C.

The obtained resins show the following characteristics:

| Amount MAPTAC | 20 g | 20 g | 20 g |
|---|---|---|---|
| Amount MBMA | 0.5 g | 1 g | 2 g |
| Ionic charges per ml of resin | 168 µeq | 212 µeq | 231 µeq |
| Sorption capacity per ml | 114 | 106 | 76 |
| Porosity factors | 0.52 | 0.52 | 0.51 | for BSA ($V_e/V_t$).

It is demonstrated that the amount of crosslinking agent does not modify the porosity of the three dimensional polymer at least within the explored zone. The amount of ionic groups which depends on the amount of the main monomer remains also quite constant.

All of the above resins are stable to oxidizing agents, such as hypochlorites and peraceticacid.

EXAMPLE 6

Preparation of strong cationic exchangers using silicas of different porosity.

7 g of AMPS, 3 g of MAPTAC and 1 g of MBA are dissolved in 100 ml of distilled $H_2O$. 1 g of ammonium persulfate is then added and the solution is divided into two parts of 50 ml each. Separately, each solution is added to 50 g of dry silica having the following properties listed in the table below:

| | Particle Size | Surface Area | Porous Volume | Pore Diameter |
|---|---|---|---|---|
| Assay a | 40–100 µm | 25 m²/g | 1 cm³/g | 1250 Å |
| Assay b | 40–100 µm | 10 m²/g | 1 cm³/g | 3000 Å |

All other operations are performed according to Example 1.

The following are the final properties of the cationic exchangers:

| | Assay a | Assay b |
|---|---|---|
| Ionic charges per ml | 92 µeq | 89 µeq |
| Sorption capacity (cytochrome c) | 86 mg | 81 mg |
| Non-specific absorptions | negative | negative |

This example demonstrates that the available porosity is independent of the silica quality. The choice of silica is more linked to its sensitivity to an alkaline media. For example, the alkaline sensitivity of silica having a surface area of 5 m²/g is 50% lower than when using a sample having a surface area of 25 m²/g.

EXAMPLE 7

Preparation of cation-exchangers using different amounts of anionic monomer.

The aqueous solutions of monomers (100 ml) are composed of:

| MAPTAC | 3 g (monomer to neutralize the silanol groups of silica) |
|---|---|
| AMPS | 7 g and 10 g (varying amounts of anionic monomer) |
| MBA | 1 g (crosslinker) |

All other operations (mixing with silica, polymerization and recovery) are identical to those described on Example 1.

The final properties of the final cation-exchangers obtained are as follows:

| Quantity of AMPS | 7 g | 10 g |
|---|---|---|
| Ion-exchange groups per ml | 92 eq | 147 eq |
| Sorption capacity per ml (cytochrome c) | 86 mg | 120 mg |

This example confirms that when the amount of functionalized monomer in the initial solution is increased, the number of ion-exchange groups is proportionately higher. The sorption capacity for cytochrome c increases as well.

EXAMPLE 8

Preparation of a strong cation-exchange resin with MBMA as crosslinker.

0.5 g of MBMA are dissolved in 50 ml of DMSO while stirring. To this solution 30 ml of aqueous solution containing 10 g of AMPS is added as well as 6 ml of a 50% aqueous solution of MAPTAC.

The final volume is adjusted to 100 ml prior the addition of 1 g of ammonium persulfate at room temperature.

This solution of monomers is added dropwise to 100 g of dry porous silica to fill completely the available porous volume (1 cm$^3$/g for a pore size of 1250 Å). The remaining operations are identical to the method described in Example 1. The final cation-exchange resin shows the following characteristics:

| ion-exchange groups per ml of resin | 123 µeq |
|---|---|
| sorption capacity for cytochrome c | 128 mg |
| porosity factor for lysozyme | 0.82 |
| resistance to oxidizing agents (NaOCl) | Excellent even at a concentrated form (1/10 dilution of commercial) concentrated product. |

EXAMPLE 9

Preparation of a weak cation-exchange resin.

In 60 ml of distilled water, 6 ml of a 50% aqueous solution of MAPTAC, 1 g of MBA and 10 ml of acrylic acid are dissolved.

The volume of the solution is then adjusted to 100 ml, the pH adjusted to about 4.5, and 1 g of ammonium persulfate is added at room temperature.

As described for other examples the solution of monomers is added to 100 g of porous silica and then polymerized in a non-aqueous water-immiscible solvent (e.g., paraffin oil, toluene, or methylene chloride).

The final characteristics of the resin are as follows:

| Ion-exchange groups (carboxylates) per ml | 337 µeq |
|---|---|
| Sorption capacity for cytochrome c | 118 mg |
| Non-specific adsorption (chromatographic test) | Excellent |

EXAMPLE 10

Preparation of non-ionic hydroxyl-containing resins for immobilization of biologicals.

The monomers comprising the initial solution are the following:

| Tris-hydroxymethyl-methyl-methacrylamide (THMMA) | Non ionic monomer |
|---|---|
| MAPTAC or DEAE methacrylamide | cationic monomer to neutralize the silanol groups. |
| MBA | crosslinking agent |

The composition of the solutions are:

|  | Assay a | Assay b | Assay c |
|---|---|---|---|
| THMMA | 10 g | 10 g | 20 g |
| MAPTAC | 1.5 g | — | 2.5 g |
| DEAE-methacrylamide | — | 2 g | — |
| MBA | 2 g | 3 g | 2 g |

All other operations (mixture with dry silica, polymerization and recovery) are identical to those described in previous examples.

The final characteristics of the resins are:

Good passivation of the silica surface. No significant amount of cationic proteins adsorbed in normal conditions of gel filtration.

$V_e/V_t$ for bovine albumin is respectively 0.71, 0.74 and 0.61.

After chemical modification the resin is utilized to immobilize either a dye (Cibacron Blue F3GA) or heparin.

Each affinity sorbent is very effective to purify human albumin and antithrombin III, respectively, in a single pass.

EXAMPLE 11

Preparation of a cationic resin in the presence of polyethylene glycol as a pore inducer.

Two monomer solutions are prepared as described in Example 8. A solution of 10 g of polyethylene glycol 6000 is added to one.

Final volumes are adjusted to 100 ml, pH adjusted to about 7 and then 1 g of ammonium persulfate is added to both solutions.

The monomer mixture is added to porous silica (1200 Å pore diameter, 40–100 µm particle diameter, 25 m$^2$/g surface area), polymerization and recovery are effected as described in previous examples. The obtained resins show the following characteristics:

|  | +PEG-6000 (10%) | PEG-6000 |
|---|---|---|
| MAPTAC | 20 g | 20 g |
| MBMA | 1 g | 1 g |
| CATIONIC GROUPS (µeq/ml) | 200 | 193 |
| SORPTION CAPACITY BSA | 112 | 127 |
| Ve/Vt β-lactoglobulin | 0.578 | 0.511 |
| Ve/Vt BSA | 0.548 | 0.513 |

|  | +PEG-6000 (10%) | PEG-6000 |
|---|---|---|
| Ve/Vt Immunoglobulins G | 0.495 | 0.481 |

This example demonstrates that, in spite of the same amount of initial material (similar number of ionic groups), the porosity is influenced by the presence of PEG-6000.

The exclusion limit is actually larger when PEG is added.

EXAMPLE 12

Further separations of protein mixtures by ionic resins.

Two resins are used to show their ability to separate protein mixtures rapidly and efficiently:
 a cationic resin (quaternary ammonium resin from Example 5).
 an anionic sulfonated resin (see Example 8).

The cationic resin (201 µeq quaternary amino groups/ml) is packed in a column of 1 cm in diameter and 8 cm in length and then equilibrated with a 0.05M Tris-HCl buffer, pH 8.5. A sample containing 1 mg of cytochrome c, hemoglobin, betalactoglobulin and ovalbumin is injected and separated under a salt gradient.

The results of the separation of the four components is given below (FIG. 1A). Separation is achieved under a flow rate of 120 ml/hour.

The anionic resin (138 µeq $SO_3$ groups/ml) is packed in a column of 1 cm in diameter and 7 cm in length and then equilibrated with a 0.05M acetate buffer, pH 4.5. A sample containing ovalbumin, betalactoglobulin, cytochrome c, and lysozyme is injected and separated under a salt gradient.

The result of the separation of four components is given below (FIG. 1B). Separation is achieved under a flow rate of 140 ml/hour.

EXAMPLE 13

Demonstration of the need to neutralize the silanol group when preparing a cation exchange resin.

Two aqueous solutions of monomer (100 ml each) are prepared according to Example 1 differing essentially by the presence of the cationic monomer MAPTAC.

Final composition of monomer solutions is as follows:

|  | Assay a | Assay b |
|---|---|---|
| AMPS | 10 g | 10 g |
| MBMA | 0.5 g | 0.5 g |
| MAPTAC | 3 g | 0 |

All the operations (mixing with silica, polymerization and recovery) are identical to those described in the above-mentioned examples.

The final properties of the obtained cation exchangers are as follows:

|  | Assay a | Assay b |
|---|---|---|
| Ion-exchanger groups per ml | 123 µeq | 118 µeq |
| Sorption capacity per ml (cyt. c) | 128 mg | 77 mg |
| Separation efficiency | excellent (see FIGURE below) | no separation |

This result demonstrates the necessity to neutralize acidic silanols that disturb the separation mechanism.

EXAMPLE 14

Influence of the amount of cationic monomer on the passivation of silica surface.

To demonstrate that the amount of cationic monomer necessary to neutralize silanol groups (passivation is proportional to the surface area) a series of trials are effected with porous silicas with different surface area.

Silicas chosen are the following:

|  | Silica X 015 | Silica X 075 |
|---|---|---|
| Surface area per g | 25 m² | 100 m² |
| Porous volume per g | 1 cm³ | 1 cm³ |
| Bead size | 40–100 microns | 40–100 microns |

Trials are performed using different amounts of MAPTAC (cationic monomer) copolymerized with a non-ionic acrylic monomer (THMMA).

After polymerization, the degree of passivation is estimated by the measurement of non-specific adsorption of lysozyme.

TABLE I

COMPOSITION OF POLYMERS AND RELATED ANALYTICAL RESULTS

| Type of silica | X 075 | X 075 | X 075 | X 075 | X 075 | X 015 | X 015 | X 015 |
|---|---|---|---|---|---|---|---|---|
| Surface area/g | 100 m² | 100 m² | 100 m² | 100 m² | 100 m² | 25 m² | 25 m² | 23 m² |
| Amount MAPTAC | 0% | 1.5% | 3% | 6% | 12% | 0% | 1.5% | 3% |

TABLE I-continued

COMPOSITION OF POLYMERS AND RELATED ANALYTICAL RESULTS

| Crosslinking ratio | 0% | 10% | 10% | 10% | 10% | 0% | 10% | 10% |
|---|---|---|---|---|---|---|---|---|
| Non-specific ads. (Lysozyme) | 55 mg | 13 mg | 13 mg | 0 mg | 0 mg | 15 mg | 0 mg | 0 mg |
| Passivation ration level | – | ± | + | + | ++ | – | + | ++ |

++Indicates that the number of non-specific absorptions is close to zero, indicating an excellent passivation level.

+At a non-specific adsorption of less than 10 mg, passivation is also quite good.

±Indicates that the passivation level is less than 15 mg, which in most instances is not acceptable for use in chromatographic separation.

–Indicates that the passivation level is greater than 15 mg and thus the material is not performing the separation function correctly and thus cannot be used for chromatographic separation.

It is thus demonstrated that the level of nonspecific adsorption for lysozyme (a strong cationic protein) is high when the MAPTAC is absent. The non-specific adsorption for silica with large surface areas (X 075, 100 m²/g) is higher (55 mg/ml of resin) than the non-specific adsorption for silica X 015 (25 m²/g; 15 mg/ml of resin). A certain proportionality exists between the surface area and the original level of non-specific absorptions. The amount of MAPTAC to decrease the level of non-specific adsorption down to zero is also proportional to the surface area available: 1.5% of MAPTAC is necessary with silica X 015 (25 m²/g) whereas at least 6% is necessary to passivate silica X 075 (110 m²/g).

EXAMPLE 15

Preparation of an Anion Exchange Resin Based on Polystyrene.

10 g of methacrylamidopropyltrimethylammonium chloride, 2 g of N-(1,1-dimethyl-2-phenyl)ethylacrylamide and 2 g of N,N,-methylene-bis-methacrylamide are dissolved in 30 ml of dimethyl sulfoxide. The volume of the solution is then increased to 50 ml by adding 20 ml of water. Under stirring, 0.3 g of 2,2,-azobis-(2-amidinopropane)hydrochloride is added at room temperature.

While shaking, the monomer solution is added dropwise to 50 g of porous polystyrene (50–150 μm beads diameter, 300–400 Å pore diameter). The excess of monomer solution is thus eliminated by filtration under vacuum. The impregnated polystyrene beads are introduced into a closed container and heated at 80°–90° C. for five hours to polymerize the monomer solution within the pores of the polystyrene matrix.

Finally the obtained material is washed extensively with ethanol to eliminate the excess monomers and, subsequently, with water.

The resulting resin showed the following characteristics:

Very hydrophilic material (in opposition to the totally hydrophobic nature and unwettability, of the polystyrene Ion exchange capacity: 100 μeq/ml of resin Sorption capacity for BSA: 70 mg/ml.

EXAMPLE 16

Performance Characteristics of the Passivated Porous Support of the Present Invention at High Flow Rates The performance characteristics of the passivated porous support are compared with those of other support materials under high solution flow rates (e.g., approaching 100 cm/h).

In particular, the relative sorption capacity and productivity characteristics of DEAE-Spherodex™, DEAE-Trisacryl Plus™, DEAE-Trisacryl™, DEAE-Agarose-based sorbent, and passivated porous supports of the present invention are illustrated in FIGS. 3A and 3B. The absolute sorption capacities at flow rates approaching 200 cm/h are compared for these supports in FIG. 4. The data of FIG. 4 are generated for a 50 mM Tris buffer (pH 8.6) solution of BSA (5 mg/ml).

It can be seen from FIG. 3A, that the useful sorption capacity decreases by half or more at flow rates between about 50 cm/h to about 100 cm/h for Trisacryl, Trisacryl Plus and the Agarose-based sorbent. By contrast, the degree to which the useful sorption capacity of the passivated porous supports of the present invention (e.g., the passivated support of Example 2 or 4) is retained as flow rate increases compares favorably with DEAE-Spherodex™ even at flow rates approaching 100 cm/h (i.e., the useful sorption capacity remains substantially unchanged as a function of flow rate).

Moreover, the productivity, a measure of the amount of material processed in the separation procedure per unit time, of the respective supports are compared in FIG. 3B. Again, the performance of the passivated porous supports of the present invention compares favorably with the DEAE-Spherodex™ sorbent. The passivated porous supports of the present invention are clearly superior to DEAE-Spherodex™, however, when their sorption capacities are compared on an absolute basis, as shown in FIG. 4.

EXAMPLE 17

Preparation of an Anion-Exchange Resin Using a Surface-Protected (i.e., Pre-coated) Silica Passivated Porous Support Polystyrene pellets (10 g, average molecular weight about 400,000 daltons) are dissolved in 100 ml of methylene chloride and then added dropwise to 100 g of porous silica (40–100 μm diameter, 2000–3000 Å pore diameter, 10 m²/g surface area and about 1 cm³/g porous volume). After about 30 minutes shaking the mixture is dried under an air stream at room temperature until total evaporation of the chlorinated solvent (i.e., until a constant weight is observed). The obtained dry powder is then heated at 190° C. overnight to permit the polystyrene to form a homogeneous thin layer on the surfaces (internal and external) of the silica.

Next, 20 g of methacrylamidopropyl trimethyl ammonium chloride (MAPTAC) and 1 g of N,N'-methylene-bismethacrylamide are dissolved in 80 ml of distilled water and the pH of the solution is adjusted to 7.5. Separately, 1 g of ammonium persulfate is dissolved in 20 ml of distilled water. The two solutions are then mixed together at room temperature and added dropwise to 100 g of polystyrene-coated silica, obtained as described above. After shaking for about 30 minutes, paraffin oil (250 ml) is added to the mixture, along with 2 ml of N,N,N',N'-tetramethylethylenediamine to polymerize the monomer solution inside the silica pores. The resulting suspension is then heated at 60°–70° C. to induce polymerization.

The passivated resin is then recovered by filtration. The oil is eliminated with an extensive washing with water containing 0.1–0.5% of a non-ionic detergent and then stored in a saline buffer at neutral pH. The product resin shows very similar ion-exchange characteristics as those described in Example 2. Additionally, its sensitivity in strong alkaline media is much improved as measured by its weight loss after one night of contact with 0.5M sodium hydroxide. The passivated resin of this example lost only about half as much weight as an anionic resin prepared from silica having an unprotected surface area.

Alternatively, the polystyrene can be coated on the surfaces of the matrix by polymerizing the vinyl monomer in situ, thus assuring that the internal surfaces of even the smallest pores of the matrix are coated with protective polymer. The conditions for the polymerization of the vinyl monomer are well known to those of ordinary skill (e.g., see, *Kirk-Othmer Concise Encyclopedia of Chemical Technology*, Wiley-Interscience Publication, New York, pp. 1115–1117). After such an in situ polymerization, it is preferred that the coated support be heated overnight at 190° C., as described above, to provide a homogeneous thin-film layer over the matrix.

In addition, the polystyrene may also contain substituents, particularly at the 4-position of the phenyl ring, which can be non-ionic or ionizable. For example, carboxylic acids, carboxylic acid esters or amides, sulfates, phosphates, N,N-dialkylcarboxamides, lower alkylamines, N,N-dialkylamines, quaternary ammonium groups, and the like can be present on the polymer. Indeed, a 4-iodo substituent on all or a portion of the phenyl groups of polystyrene would allow a large host of other functional group to be introduced by known methods (e.g., formation of aryllithium, Grignard, or copper reagents followed by quenching with carbon dioxide or alkylation).

Moreover, passivation of the porous solid matrix having a thin-film coating of a synthetic organic polymer can also be achieved by other variations in the procedure disclosed in the present invention, such as the method of Example 15.

EXAMPLE 18

Determination of Ion-Exchange and Protein Sorption Capacity of Preparation of Anion-Exchange Resins Based on Passivated Porous Silica Support of Different Surface Areas This example provides evidence that polymerization of the passivation mixture within porous silica matrices forms a three-dimensional polymer network or "lattice", as opposed to a thin, substantially two-dimensional surface coating. Three anion-exchange sorbents were prepared using the methods of the present invention, the differences between the sorbents relating primarily to the pore sizes and hence internal surface areas of the silica matrices. These silica substrate characteristics are summarized in the following table:

|  | X-005 | X-015 | X-075 |
|---|---|---|---|
| Particle size (microns) | 40–100 | 40–100 | 40–100 |
| Porous volume (cm³/g) | 1 | 1 | 1 |
| Pore size (Angstroms) | 3000 | 1250 | 300 |
| Surface area (m²/g) | 10 | 25 | 100 |

Surface area is seen to increase as the pore size decreases, while porous volume remains essentially constant.

The characteristics of the passivated ("Q-CPI") anion-exchange support prepared from these silica base materials are summarized in the following table:

| Silica Matrix | X-005 | X-015 | X-075 |
|---|---|---|---|
| Particle size (microns) | 40–100 | 40–100 | 40–100 |
| Ionic groups (microeq/ml) | 111 | 133 | 183 |
| BSA capacity (mg/ml) | 130 | 125 | 82 |
| Sorption efficiency | 1.17 | 0.94 | 0.45 |

The ion-exchange capacity (i.e., number of ionic groups) and BSA sorption capacity are seen to be relatively constant; in fact, these values decrease somewhat as the surface area of the silica support is increased). In particular, ion-exchange and BSA sorption capacities do not increase as the surface area of the silica increases (i.e., from left to right in the table). This supports the interpretation that the polymeric lattice formed upon polymerization of the passivating solution forms a three-dimensional, substantially pore-filling network, as opposed to a thin pore-wall surface coating.

EXAMPLE 19

Preparation of an Anion-Exchange Resin Based on a Surface-Protected (i.e., Polystyrene-Precoated) Passivated Porous Silica Support Polystyrene pellets (10 g, average molecular weight approximately 400 kD) were dissolved in 10 ml of methylene chloride and then added dropwise to 100 g of porous silica. The silica was characterized by a particle diameter of 40 to 100 microns, a pore diameter of 2000 to 3000 Angstroms, a surface area of 10 m²/g surface area, and a porous volume of about 1 cm³/g. After about 30 minutes of shaking, the mixture was dried under an air stream at room temperature until total evaporation of the chlorinated solvent had occurred, as evidenced by the attainment of a constant particle weight. The dry powder was then heated overnight at 180° C. to permit the polystyrene to form a thin, homogeneous surface layer or coating on both the internal and external exposed surface regions of the silica. This polystyrene-coated silica so obtained exhibited only a fraction of the sensitivity to alkaline media that was exhibited by unprotected silica matrices. In particular, deposition of the protective polystyrene coat in this manner was observed to reduce the extent of silica leaching by a factor of at least 2 to 3.

Next, 0.5 g of N-1-methylundecyl-acrylamide (MUA) were dissolved in 100 ml of pure ethanol, and the solution was added dropwise to 100 g of the polystyrene-coated silica obtained as described above. After shaking for about 30 minutes, the material was placed in a nitrogen stream under conditions that resulted in complete evaporation of the ethanol (again, as observed by attainment of constant solids weight).

Next, 1 g oil N,N'-methylene-bis-methacrylamide was dissolved in 20 ml of dimethylsulfoxide. To this solution, 20 g of methacrylamidopropyltrimethylammonium chloride (MAPTAC) were added, and the total volume of the solution was adjusted to 80 ml by the addition of distilled water. Separately, 0.5 g of azo-bis-amidino-propane (as initiator) was dissolved in 10 ml of distilled water and then added to the solution of monomers. The volume of the latter was then adjusted to 100 ml with water; 90 ml of this solution were then added dropwise to the polystyrene-precoated silica.

This material (i.e., monomer-solution-impregnated polystyrene-precoated silica) was then placed under nitrogen and in a closed vessel at 80° C. for over two hours. The product so obtained was then washed extensively with water and water-compatible solvents to remove any unpolymerized material and other reaction byproducts.

The cationic (i.e., anion-exchange) resin so prepared exhibited a fixed-charge density (i.e., ion-exchange capacity) of 150 microequivalents/ml of quaternary amino groups. Its capacity for reversibly absorbing BSA was 125 mg/ml. Non-specific binding (expected to be extensive and excessive for unpassivated, polystyrene-coated silica) was minimal for the material produced by the method of the present invention.

EXAMPLE 20

Preparation of a Cationic Resin Based on a Porous Polystyrene Matrix

Porous polystyrene beads, characterized by a particle diameter of 50 to 70 microns, a pore diameter of 1000 Angstroms, and a porous volume of 1.6 cm$^3$/g, were obtained as a commercially available product from Polymer Laboratories, Inc. (Amherst, Mass.). Five grams of these porous crosslinked polystyrene beads were washed extensively with ethanol and then dried under vacuum.

Separately, 61 mg of methylene-bis-methacrylamide were dissolved in 3.76 ml of dimethyl sulfoxide. To this was added 2.44 ml of an aqueous solution containing 1.3 g of methacrylamido-propyltrimethylammonium chloride (MAPTAC) and 25 mg of azo-bis-amidino-propane. To this solution, which was stirred gently under a nitrogen atmosphere at 4° C., was added 1.5 ml of pure ethanol. This solution was then added dropwise to the dry polystyrene beads until it was totally absorbed within the porous volume of the beads. After 30 minutes of shaking, the mixture was stirred in a closed vessel under a nitrogen pressure at 85° C. for at least 2 hours. After this period, the product beads were removed and washed extensively with acidic, alkaline, and aqueous alcohol solutions to remove reaction byproducts and uncopolymerized materials.

The anion-exchange resin product obtained in this manner was very hydrophilic and contained cationic groups at a density of 124 microequivalents/ml of settled resin volume. Protein sorption capacity as measured by uptake of bovine serum albumin (BSA) was between 30 and 50 mg/ml of settled resin, depending on operating conditions.

EXAMPLE 2

Preparation of a Passivated Cationic Resin Based on a Porous Polystyrene Matrix

Example 21 differs from the preceding Example 20 in its incorporation of the passivating monomer MUA into the mixture polymerized within the pores of the polystyrene support. As before, porous polystyrene beads, characterized by a particle diameter of 50 to 70 microns, a pore diameter of 1000 Angstroms, and a porous volume of 1.6 cm$^3$/g, are obtained as a commercially available product from Polymer Laboratories, Inc. (Amherst, Mass.). Five grams of these porous crosslinked polystyrene beads are washed extensively with ethanol and dried under vacuum.

Separately, 61 mg of methylene-bis-methacrylamide are dissolved in 3.76 ml of dimethyl sulfoxide. To this are added 2.44 ml of an aqueous solution containing 1.3 g of methacrylamido-propyltrimethylammonium chloride (MAPTAC) and 25 mg of azo-bis-amidino-propane. To this solution, which is stirred gently under a nitrogen atmosphere at 4° C., are added 1.5 ml of pure ethanol containing 50 mg of N-1-methylundecyl-acrylamide (MUA) as a passivating ("neutralizing") monomer. This solution is then added dropwise to the dry polystyrene beads until it is totally absorbed within the porous volume of the beads. After 30 minutes of shaking, the mixture is stirred in a closed vessel under a nitrogen pressure at 85° C. for 2 hours or more. After this period, the product beads are removed and washed extensively with acidic, alkaline, and aqueous alcohol solutions to remove reaction byproducts and uncopolymerized materials.

The anion-exchange resin product obtained in this manner contains cationic groups at a density of about 115 microequivalents/ml of settled resin volume. Protein sorption capacity as measured by uptake of bovine serum albumin (BSA) is about 80 mg/ml of settled resin. The resin is stable over a wide range of pH values (from 1 to 14) and can be used advantageously in the chromatographic separation of various protein mixtures.

EXAMPLE 22

Preparation of a Passivated Anionic Resin Based on a Porous Polystyrene Matrix

Example 22 differs from the preceding Example 21 in two respects: (i) its replacement (on a 1-for-1 basis by weight) of an anionic monomer (acrylamido-methyl-propane sulfonic acid sodium salt) for the cationic monomer (MAPTAC) used in the passivating mixture polymerized within the pores of the porous polystyrene support, and (ii) its use of N-(1,1,3, 5-tetramethyloctyl)-acrylamide as opposed to N-1-methyl-undecyl-acrylamide (MUA) as the passivating or neutralizing monomer.

As before, porous polystyrene beads, with a particle diameter of 50 to 70 microns, a pore diameter of 1000 Angstroms, and a porous volume of 1.6 cm$^3$/g, are obtained from Polymer Laboratories, Inc. Five grams of these porous crosslinked polystyrene beads are washed extensively with ethanol and dried under vacuum.

Separately, 61 mg of methylene-bis-methacrylamide are dissolved in 3.76 ml of dimethyl sulfoxide. To this are added 2.44 ml of an aqueous solution containing 1.3 g of acrylamido-methyl-propane sulfonic acid sodium salt and 25 mg of azo-bis-amidino-propane. To this solution, which is stirred gently under a nitrogen atmosphere at 4° C., are added 1.5 ml of pure ethanol containing 50 mg of N-(1,1, 3,5-tetramethyloctyl)-acrylamide as a passivating ("neutralizing") monomer. This solution is then added dropwise to the dry polystyrene beads until it is totally absorbed within the porous volume of the beads. After 30 minutes of shaking, the mixture is stirred in a closed vessel under a nitrogen pressure at 85° C. for 2 hours or more. After this period, the product beads are removed and washed extensively with acidic, alkaline, and aqueous alcohol solutions to remove reaction byproducts and uncopolymerized materials.

The cation-exchange resin product obtained in this manner is very hydrophilic and contains anionic (sulfonate) groups at a density of about 100 microequivalents/ml of settled resin volume. Protein sorption capacity as measured by uptake of lysozyme is about 95 mg/ml of settled resin. The anionic resin is stable over a wide range of pH values (from 1 to 14) and can be used advantageously in the chromatographic separation of various protein mixtures.

EXAMPLE 23

Preparation of an Anion-Exchange Resin Using a Surface-Protected (i.e., Pre-coated) and POE-Passivated Porous Silica Support Polystyrene pellets (10 g, average molecular weight approximately 400 kD) were dissolved in 10 ml of methylene chloride and then added dropwise to 100 g of porous silica. The silica was characterized by a particle diameter of 40 to 100 microns, a pore diameter of 2000 to 3000 Angstroms, a surface area of 10 $m^2/g$ surface area, and a porous volume of about 1 $cm^3/g$. After about 30 minutes of shaking, the mixture was dried under an air stream at room temperature until total evaporation of the chlorinated solvent had occured, as evidenced by attainment of a constant particle weight. The dry powder was then heated overnight at 190°–200° C.

This polystyrene-coated silica was then suspended in 200 ml of an aqueous solution of 5% polyoxyethylene (POE) with an average molecular weight of about 600 kD. The mixture was stirred gently for about 5 hours at 85° C. and then the excess solution was removed by filtration. The silica beads were then washed extensively with water to remove the excess POE; the beads were finally rinsed twice with pure ethanol and dried.

Separately, 1 g of N,N'-methylene-bismethacrylamide was dissolved in 20 ml of dimethylsulfoxide under stirring. To this Solution, 20 g of methacrylamidopropyl-trimethylammonium chloride was added, and the total volume of the solution was adjusted to 80 ml by the addition of distilled water. Next, 0.5 g of azo-bis-amidino-propane was dissolved in 10 ml of water and then added to the solution of monomers. The latter was then adjusted to a total volume of 100 ml with water. Ninety milliliters of this solution were then added dropwise to the precoated POE-treated dry silica. The silica, impregnated with monomer solution, was then placed in a closed vessel at 80° C. and the polymerization was effected under nitrogen for two hours. The product So obtained was washed extensively with water and water-compatible solvents at acidic and alkaline pH values to eliminate any unpolymerized materials and reaction by products.

The cationic (i.e., anion-exchange) resin so obtained exhibited an ion-exchange capacity of 170 microequivalents/ml of quaternary ammonium groups and displayed a reversible BSA sorption capacity of 115 mg/ml. No non-specific binding was evident during a chromatographic separation conducted with the material.

EXAMPLE 24

Preparation of an Anion-Exchange Resin Using a Surface-Protected (i.e., Pre-coated) and PVP-Passivated Porous Silica Support Polystyrene pellets (10 g, average molecular weight approximately 400 kD) are dissolved in 10 ml of methylene chloride and then added dropwise to 100 g of porous silica with characteristics described in the previous example. After about 30 minutes of shaking, the mixture is dried under an air stream at room temperature until total evaporation of the chlorinated solvent has occured, as evidenced by attainment of a constant particle weight. The dry powder is then heated overnight at 190°–200° C.

This polystyrene-coated silica is then suspended in 200 ml of an aqueous solution of 5% polyvinylpyrrolidone (PVP) with an average molecular weight of about 400 kD. The mixture is stirred gently for about 5 hours at 85° C. and then the excess solution is removed by filtration. The silica beads are then washed extensively with water to remove the excess POE; the beads are finally rinsed twice with pure ethanol and dried.

Separately, 1 g of N,N'-methylene-bismethacrylamide are dissolved in 20 ml of dimethylsulfoxide under stirring, To this solution, 20 g of methacrylamidopropyl-trimethylammonium chloride are added, and the total volume of the solution is adjusted to 80 ml by the addition of distilled water. Next, 0.5 g of azo-bid-amidino-propane are dissolved in 10 ml of water and then added to the solution of monomers. The latter is then adjusted to a total volume of 100 ml with water. Ninety milliliters of this solution are then added dropwise to the precoated POE-treated dry silica. The silica, impregnated with monomer solution, is then placed in a closed vessel at 80° C. and the polymerization is effected under nitrogen for two hours. The product so obtained is washed extensively with water and water-compatible solvents at acidic and alkaline pH values to eliminate any unpolymerized materials and reaction by products.

The cationic (i.e., anion-exchange) resin so obtained exhibits an ion-exchange capacity of about 160 microequivalents/ml of quaternary ammonium groups and displays a reversible BSA sorption capacity of about 120 mg/ml. Little or no non-specific binding is evident during a chromatographic separation conducted with the material.

EXAMPLE 25

Preparation of a Cation-Exchange Resin Using a Surface-Protected (i.e., Pre-coated) and POE-Passivated Porous Silica Support Polystyrene pellets (10 g, average molecular weight approximately 400 kD) are dissolved in 10 ml of methylene chloride and then added dropwise to 100 g of porous silica with the following characteristics: a particle diameter of 25 to 60 microns, a pore diameter of 3000 Angstroms, a surface area of 15 $m^2/g$ surface area, and a porous volume of about 1 $cm^3/g$. After about 30 minutes of shaking, the mixture is dried under an air stream at room temperature until total evaporation of the chlorinated solvent has occured, as evidenced by attainment of a constant particle weight. The dry powder is then heated overnight at 190°–200° C.

This polystyrene-coated silica is then suspended in 200 ml of an aqueous solution of 5% polyoxyethylene and stirred gently for about 5 hours at 85° C. The excess solution is removed by filtration. The silica beads are then washed extensively with water to remove the excess POE; the beads are finally rinsed twice with pure ethanol and dried.

Next, 1 g of N,N'-methylene-bis-methacrylamide, 1 g of methacrylamidopropyl-trimethylammonium chloride, and 18 g of acrylamido-methyl-propane sulfonic acid sodium salt are dissolved in 90 ml of a solvent mixture comprised of 20 ml of dimethylsulfoxide, 60 ml of water, and 10 ml of ethanol. To this solution 10 ml of water containing 0.5 g of azo-bis-amidinopropane are added. The final mixture so obtained is then added dropwise to the "dry", polystyrene-protected silica. This silica, impregnated with monomer solution, is then placed in a closed vessel at 80° C. and the polymerization is effected under nitrogen for a period of at least 3 hours. The polyanionic product so obtained is then washed extensively as described in the immediately preceding examples.

The resin so obtained exhibits an ion-exchange capacity of about 100 microequivalents/ml of sulfonate groups and displays a reversible lysozyme sorption capacity of about 130 mg/ml.

It should be apparent to those skilled in the art that other compositions and methods not specifically disclosed in the instant specification are, nevertheless, contemplated thereby. Such other compositions and methods are considered to be within the scope and spirit of the present invention. Hence, the invention should not be limited by the description of the specific embodiments disclosed herein but only by the following claims.

What is claimed is:

1. A passivated chromatographic media comprising (i) a porous mineral oxide substrate matrix having interior and exterior surfaces and innate groups that render said substrate matrix susceptible to undesirable non-specific interaction with biological molecules, and (ii) a three-dimensional, pore-filling gel network derived from polymerization of a main monomer, a neutralizing monomer different from said main monomer and having one or more polar and/or cationic functional group(s) and one or more reactive functional group(s), and a crosslinking agent, wherein said monomers and said crosslinking agent have first been allowed to come into intimate contact with said surfaces of said substrate matrix before said polymerization to form said gel network, wherein said polar and/or cationic functional groups of said neutralizing monomer are substantially adjacent to and interact with said innate groups of said substrate matrix, and said reactive functional groups of said neutralizing monomer when polymerized are covalently linked to said main monomers, and wherein said gel network has become associated with said surfaces of said porous substrate matrix by means of non-covalent interactions between said innate groups of said substrate matrix and said neutralizing monomer, and said gel network extends into and throughout the porous volume of said substrate matrix to substantially fill said porous volume, and wherein said innate groups of said substrate matrix have become deactivated, resulting in the substantial elimination of said undesirable non-specific interaction.

2. The passivated chromatographic media of claim 1 further comprising reversible high sorptive capacity.

3. The passivated chromatographic media of claim 2 in which said reversible sorptive capacity for said biological molecule ranges from about 1 to about 300 milligrams per milliliter of passivated chromatographic media bed.

4. The passivated chromatographic media of claim 1 further comprising chemical stability on exposure to strong acidic or alkaline medium.

5. The passivated chromatographic media of claim 1 further comprising chemical stability on exposure to strong oxidizing medium.

6. The passivated chromatographic media of claim 1 in which said matrix comprises silica.

7. The passivated chromatographic media of claim 1 in which said matrix comprises alumina.

8. The passivated chromatographic media of claim 1 in which said matrix has an initial average particle size ranging from about 5 to about 1000 microns.

9. The passivated chromatographic media of claim 1 in which said matrix has an initial average particle size ranging from about 10 to about 100 microns.

10. The passivated chromatographic media of claim 1 in which said matrix has an initial porous volume ranging from about 0.2 to about 2 cm$^3$/gram.

11. The passivated chromatographic media of claim 1 in which said matrix has an initial surface area ranging from about 1 to about 800 m$^2$/gram.

12. The passivated chromatographic media of claim 1 in which said matrix has an initial pore size ranging from about 50 to about 6000 angstroms.

13. The passivated chromatographic media of claim 1 further comprising a size exclusion limit ranging from about 500 to about 2,000,000 daltons.

14. The passivated chromatographic media of claim 1 in which said polymerization of said passivation mixture is effected in the presence of a pore inducer.

15. The passivated chromatographic media of claim 14 in which said pore inducer is selected from the group consisting of polyethylene glycol, polyoxyethylene, and polysaccharide.

16. The passivated chromatographic media of claim 1 in which said polymerization of said passivation mixture is effected in the presence of a polar solvent.

17. The passivated chromatographic media of claim 16 in which said polar solvent is selected from the group consisting of an alcohol, a cyclic ether, a ketone, a tertiary amide, a dialkyl sulfoxide, and mixtures thereof.

18. The passivated chromatographic media of claim 16 in which said polar solvent is selected from the group consisting of methanol, ethanol, propanol, tetrahydrofuran, dimethylsulfoxide, dimethylformamide, acetone, dioxane, and mixtures thereof.

19. The passivated chromatographic media of claim 1 in which said polymerization of said passivation mixture is effected in the presence of a polymerization initiator.

20. The passivated chromatographic media of claim 19 in which said polymerization initiator is selected from the group consisting of persulfate/tertiary amine, nitriles, transition metals, and photochemical initiators.

21. The passivated chromatographic media of claim 19 in which said polymerization of said passivation mixture is effected by radiant energy.

22. The passivated chromatographic media of claim 1 in which said main monomer comprises a vinyl monomer having at least one polar substituent.

23. The passivated chromatographic media of claim 22 in which said polar substituent is nonionic.

24. The passivated chromatographic media of claim 22 in which said polar substituent is ionic or ionizable.

25. The passivated chromatographic media of claim 22 in which said vinyl monomer has at least two polar substituents that may be ionic, nonionic, ionizable or a combination thereof.

26. The passivated chromatographic media of claim 22 in which said polar substituent is positively charged.

27. The passivated chromatographic media of claim 22 in which said polar substituent is negatively charged.

28. The passivated chromatographic media of claim 1 in which said main monomer is selected to provide a polymer network that has an affinity for a preselected biological molecule.

29. The passivated chromatographic media of claim 1 in which said neutralizing monomer comprises a vinyl monomer having at least one polar ionic or ionizable substituent.

30. The passivated chromatographic media of claim 27 in which said substituent is positively charged.

31. The passivated chromatographic media of claim 1 in which said neutralizing monomer is selected to provide a polymer network that is effective to deactivate hydroxyl groups on the surfaces of said matrix.

32. The passivated chromatographic media of claim 1 in which said neutralizing monomer is selected from the group consisting of diethylaminoethyl acrylamide, diethylaminoethyl methacrylamide, dimethylaminoethyl methacrylate, methacrylamido propyltrimethyl ammonium halide, triethylaminoethyl acrylamide, trimethylaminoethyl methacrylate, polyethyleneglycol dimethacrylate, and polyethyleneglycol diacrylate.

33. The passivated chromatographic media of claim 1 in which said crosslinking agent comprises a vinyl monomer having at least one other polymerizable group.

34. The passivated chromatographic media of claim 31 in which said polymerizable group is selected from the group consisting of a double bond, a triple bond, an allylic group, an epoxide, an azetidine, and a strained carbocyclic ring.

35. The passivated-chromatographic media of claim 1 in which said crosslinking agent is selected from the group consisting of N,N'-methylenebis(acrylamide), N,N'-methylenebis(methacrylamide), diallyl tartradiamide, allyl methacrylate, diallyl amine, diallyl ether, diallyl carbonate, divinyl ether, 1,4-butanedioldivinylether, polyethyleneglycol divinyl ether, and 1,3-diallyloxy-2-propanol.

36. The passivated chromatographic media of claim 1 in which said innate groups include silanols.

37. The passivated chromatographic media of claim 1 in which said innate groups can participate in hydrogen bonding or electrostatic interactions.

38. The passivated chromatographic media of claim 1 further comprising (i) a porous silica matrix having interior and exterior surfaces and silanol groups that render said matrix susceptible to undesirable non-specific interactions with biological molecules, and (ii) a polymer network derived from a passivation mixture comprising a main monomer, a neutralizing monomer different from said main monomer, and a crosslinking agent, said mixture having been allowed to come into intimate contact with said surfaces of said matrix for a sufficient period of time such that on polymerization of said mixture said silanol groups of said matrix become deactivated, resulting in the substantial elimination of said undesirable non-specific interaction.

* * * * *